(12) United States Patent
Machiorlette et al.

(10) Patent No.: US 10,881,194 B2
(45) Date of Patent: Jan. 5, 2021

(54) COMPUTERIZED COSMETICS BRUSHES

(71) Applicant: Worth Beauty, LLC, Houston, TX (US)

(72) Inventors: Steven C. Machiorlette, Houston, TX (US); Scott E. Brient, Roswell, GA (US); Kyle M. Globerman, Marietta, GA (US); Alfred S. Nugent, IV, Marietta, GA (US)

(73) Assignee: Worth Beauty, LLC, Houston, TX (US)

( * ) Notice: Subject to any disclaimer, the term of this patent is extended or adjusted under 35 U.S.C. 154(b) by 0 days.

(21) Appl. No.: 16/853,657

(22) Filed: Apr. 20, 2020

(65) Prior Publication Data
US 2020/0260860 A1 Aug. 20, 2020

Related U.S. Application Data

(63) Continuation-in-part of application No. 15/281,293, filed on Sep. 30, 2016, now Pat. No. 10,624,448.
(Continued)

(51) Int. Cl.
G09B 5/02 (2006.01)
A46B 15/00 (2006.01)
(Continued)

(52) U.S. Cl.
CPC .......... A46B 15/0022 (2013.01); A45D 33/00 (2013.01); A45D 40/262 (2013.01);
(Continued)

(58) Field of Classification Search
CPC .............................................. A46B 15/0002
(Continued)

(56) References Cited

U.S. PATENT DOCUMENTS

D20,006 S 7/1890 Lessard
D25,775 S 7/1896 Neubert et al.
(Continued)

FOREIGN PATENT DOCUMENTS

CH 663148 11/1987
GB 1480265 7/1977
TW D131817 11/2009

OTHER PUBLICATIONS

Advisory Action, dated Oct. 11, 2019, from corresponding U.S. Appl. No. 15/281,293.
(Continued)

Primary Examiner — Kesha Frisby
(74) Attorney, Agent, or Firm — Brient IP Law, LLC

(57) ABSTRACT

A computer-implemented method of training a user to effectively apply makeup using a computerized makeup brush, the method comprising the steps of receiving, from a makeup brush movement tracking system that comprises one or more sensors for sensing the movement of the makeup brush relative to a particular portion of a user's body, data representing a movement of the makeup brush relative to the particular portion of the user's body over a particular period of time as the makeup brush is used to apply makeup brush to the particular portion of the user's body, and using the data to generate and display, to a user, a visual representation of the movement of the makeup brush over the particular period of time on a suitable display (e.g., while providing appropriate visual or audio feedback on the user's performance in applying makeup and/or proper makeup application techniques).

20 Claims, 7 Drawing Sheets

Related U.S. Application Data

(60) Provisional application No. 62/236,840, filed on Oct. 2, 2015.

(51) Int. Cl.
*G09B 19/00* (2006.01)
*A45D 33/00* (2006.01)
*A45D 40/26* (2006.01)
*A46B 9/02* (2006.01)

(52) U.S. Cl.
CPC ............ *A46B 9/021* (2013.01); *G09B 5/02* (2013.01); *G09B 19/00* (2013.01); *A46B 2200/1046* (2013.01)

(58) Field of Classification Search
USPC ................................................ 434/84, 100
See application file for complete search history.

(56) References Cited

U.S. PATENT DOCUMENTS

| | | |
|---|---|---|
| D94,534 S | 2/1935 | Bowker et al. |
| 2,032,664 A | 3/1936 | Raptis |
| 2,747,217 A | 5/1956 | Stahl |
| 2,792,581 A | 5/1957 | Woyton |
| 2,814,066 A | 11/1957 | Lesh, Jr. |
| 2,913,750 A | 11/1959 | Aversa |
| 2,930,056 A | 3/1960 | Lappin |
| 3,030,647 A | 4/1962 | Peyron |
| 3,030,967 A | 4/1962 | Peyron |
| 3,309,728 A | 3/1967 | Seaver |
| 3,369,265 A | 2/1968 | Halberstadt et al. |
| 3,474,795 A | 10/1969 | Lutz et al. |
| 3,661,018 A | 5/1972 | Keefer et al. |
| 4,040,753 A | 8/1977 | Griffith |
| 4,189,801 A | 2/1980 | Lanusse |
| D276,192 S | 11/1984 | Fusco |
| D276,480 S | 11/1984 | Nigro |
| 4,492,241 A | 1/1985 | Thaler et al. |
| 4,525,889 A | 7/1985 | Dunau |
| D304,392 S | 11/1989 | Reich |
| D310,917 S | 10/1990 | Futter |
| 5,044,034 A | 9/1991 | Iannucci |
| 5,078,157 A | 1/1992 | Golan et al. |
| 5,197,496 A | 3/1993 | Nakamura |
| 5,235,716 A | 8/1993 | Stella |
| 5,366,314 A | 11/1994 | Young |
| D370,126 S | 5/1996 | Pfanstiehl et al. |
| D376,910 S | 12/1996 | Tuchman |
| D394,353 S | 5/1998 | Berti |
| 5,781,955 A | 7/1998 | Hendricks |
| D401,419 S | 11/1998 | Jerome et al. |
| 5,954,064 A | 9/1999 | Motherhead |
| D420,807 S | 2/2000 | Rodney et al. |
| 6,039,052 A | 3/2000 | Choi |
| 6,056,470 A | 5/2000 | Nehashi et al. |
| 6,170,108 B1 | 1/2001 | Knight |
| 6,230,717 B1 | 5/2001 | Marx et al. |
| 6,321,408 B1 | 11/2001 | Esterson et al. |
| 6,363,948 B2 | 4/2002 | Choi |
| D458,761 S | 6/2002 | Mason |
| 6,510,578 B1 | 1/2003 | Cyr et al. |
| 6,546,585 B1 | 4/2003 | Blaustein et al. |
| 6,553,601 B1 | 4/2003 | Major |
| 6,557,212 B2 | 5/2003 | Huang |
| 6,582,224 B1 | 6/2003 | Lilien et al. |
| 6,594,850 B2 | 7/2003 | Libman et al. |
| 6,622,733 B2 | 9/2003 | Saksa |
| 6,631,806 B2 | 10/2003 | Jackson |
| 6,669,397 B1 | 12/2003 | Christion |
| 6,671,919 B2 | 1/2004 | Davis |
| 6,709,185 B2 | 3/2004 | Lefevre |
| 6,775,875 B2 | 8/2004 | Ornelas et al. |
| 6,804,852 B1 | 10/2004 | Hay |
| 6,820,301 B2 | 11/2004 | Petner |
| 6,872,026 B2 | 3/2005 | Petner |
| 6,910,241 B2 | 6/2005 | Wang |
| 6,915,541 B2 | 7/2005 | Alexander |
| 6,968,590 B2 | 11/2005 | Ponzini |
| 7,059,006 B1 | 6/2006 | Huff et al. |
| 7,065,824 B2 | 6/2006 | Petner |
| RE39,185 E | 7/2006 | Noe et al. |
| 7,165,285 B1 | 1/2007 | Hajianpour |
| 7,165,906 B2 | 1/2007 | Dieudonat et al. |
| 7,174,898 B2 | 2/2007 | Bosman |
| 7,185,386 B2 | 3/2007 | Segrea |
| 7,228,864 B2 | 6/2007 | Tahara |
| 7,234,474 B2 | 6/2007 | Byun |
| 7,267,125 B2 | 9/2007 | Nevakshonoff |
| 7,275,885 B2 | 10/2007 | Byun |
| D556,009 S | 11/2007 | Settles |
| 7,296,945 B1 | 11/2007 | Byun |
| 7,340,794 B2 | 3/2008 | Brown et al. |
| 7,377,001 B2 | 5/2008 | McKay |
| 7,384,208 B2 | 6/2008 | Bouix et al. |
| 7,386,910 B2 | 6/2008 | Minkler et al. |
| 7,386,913 B2 | 6/2008 | Jackson |
| 7,481,592 B2 | 1/2009 | Gueret |
| 7,555,802 B2 | 7/2009 | Bohannon et al. |
| D598,655 S | 8/2009 | Thorpe et al. |
| 7,574,768 B2 | 8/2009 | Morris et al. |
| 7,581,275 B2 | 9/2009 | Rekart |
| 7,652,866 B2 | 1/2010 | Barnard et al. |
| 7,690,067 B2 | 4/2010 | Schaefer et al. |
| 7,695,207 B1 | 4/2010 | Laghi |
| 7,698,771 B2 | 4/2010 | Gall et al. |
| 7,730,570 B1 | 6/2010 | Billups |
| 7,730,571 B2 | 6/2010 | Libman |
| 7,743,451 B2 | 6/2010 | Kim |
| 7,752,701 B2 | 7/2010 | Bohannon et al. |
| 7,753,609 B2 | 7/2010 | Bouix et al. |
| 7,758,525 B2 | 7/2010 | Thiebaut et al. |
| 7,774,889 B2 | 8/2010 | Weaver |
| 7,784,144 B2 | 8/2010 | Renault |
| 7,788,756 B2 | 9/2010 | Kraemer |
| 7,789,092 B2 | 9/2010 | Akridge et al. |
| D627,975 S | 11/2010 | Chang |
| 7,832,954 B2 | 11/2010 | Gueret |
| D630,437 S | 1/2011 | Carey |
| D631,255 S | 1/2011 | Vilain et al. |
| D640,471 S | 1/2011 | Lin |
| 7,909,044 B2 | 3/2011 | Tranchant et al. |
| 7,921,496 B2 | 4/2011 | Choi |
| 7,984,528 B2 | 7/2011 | Giacolo et al. |
| 8,016,733 B2 | 9/2011 | Kim |
| D646,488 S | 10/2011 | Rennette |
| 8,033,746 B2 | 10/2011 | Tsai |
| 8,042,216 B2 | 10/2011 | Jochim et al. |
| 8,065,774 B2 | 11/2011 | Schiesz et al. |
| 8,074,666 B2 | 12/2011 | Piao |
| D653,038 S | 1/2012 | Park |
| 8,091,560 B2 | 1/2012 | Kim et al. |
| 8,132,285 B2 | 3/2012 | Piao |
| 8,132,541 B1 | 3/2012 | Baer, Jr. |
| 8,230,543 B2 | 7/2012 | Shrier et al. |
| 8,234,744 B2 | 8/2012 | Seng et al. |
| 8,245,714 B2 | 8/2012 | Malvar et al. |
| 8,250,715 B2 | 8/2012 | Bagley |
| 8,261,398 B2 | 9/2012 | Haigh et al. |
| D669,274 S | 10/2012 | Meurrens |
| 8,321,987 B2 | 12/2012 | Bagley |
| 8,332,983 B1 | 12/2012 | Prohoroff |
| 8,337,109 B2 | 12/2012 | Petit |
| 8,353,076 B1 | 1/2013 | Asta |
| D675,449 S | 2/2013 | Martin et al. |
| 8,448,287 B2 | 5/2013 | Ponzini et al. |
| D685,191 S | 7/2013 | Martin et al. |
| 8,484,788 B2 | 7/2013 | Brewer et al. |
| 8,495,786 B2 | 7/2013 | Naftal |
| 8,500,754 B2 | 8/2013 | Hull, Jr. |
| 8,518,001 B2 | 8/2013 | Hasenoehrl et al. |
| 8,561,241 B2 | 10/2013 | Lim et al. |
| 8,562,352 B2 | 10/2013 | Fairweather |
| 8,566,999 B1 | 10/2013 | Casey |

(56) References Cited

U.S. PATENT DOCUMENTS

| | | | |
|---|---|---|---|
| 8,567,000 | B2 | 10/2013 | Kubo |
| 8,578,563 | B2 | 11/2013 | Bagley |
| 8,597,667 | B2 | 12/2013 | Kamen et al. |
| 8,640,295 | B2 | 2/2014 | Schiesz et al. |
| 8,668,401 | B2 | 3/2014 | Francavilla |
| 8,672,570 | B2 | 3/2014 | Jollet et al. |
| 8,678,692 | B2 | 3/2014 | Yoon |
| 8,726,916 | B2 | 5/2014 | Park |
| 8,777,507 | B1 | 7/2014 | Carey |
| D719,739 | S | 12/2014 | Brescia et al. |
| 8,919,353 | B2 | 12/2014 | Richardson |
| D730,062 | S | 5/2015 | Lim |
| 9,125,482 | B2 | 9/2015 | Amicon |
| 9,272,141 | B2 | 3/2016 | Nichols |
| D752,882 | S | 4/2016 | Chang |
| 9,320,349 | B2 | 4/2016 | Hwang |
| D757,441 | S | 5/2016 | Hwang |
| D768,998 | S | 10/2016 | Kim et al. |
| 9,462,871 | B2 | 10/2016 | Machiorlette et al. |
| 9,468,281 | B2 | 10/2016 | Schreiber et al. |
| 9,474,358 | B2 | 10/2016 | Brewer et al. |
| D770,185 | S | 11/2016 | Shown et al. |
| 9,763,508 | B2 | 9/2017 | Reishus et al. |
| 2003/0192564 | A1 | 10/2003 | Johnson |
| 2004/0010877 | A1 | 1/2004 | Jackson |
| 2004/0016073 | A1 | 1/2004 | Knutson |
| 2004/0168700 | A1 | 9/2004 | Dorf |
| 2005/0204497 | A1 | 9/2005 | Hillenbrand |
| 2005/0273951 | A1 | 12/2005 | Karl |
| 2006/0200099 | A1 | 9/2006 | La Bianco et al. |
| 2007/0151061 | A1 | 7/2007 | Mink et al. |
| 2007/0186946 | A1 | 8/2007 | Castleberry |
| 2008/0087297 | A1 | 4/2008 | Rahbar-Dehghan |
| 2008/0142032 | A1 | 6/2008 | Liberty et al. |
| 2008/0236607 | A1 | 10/2008 | Lee et al. |
| 2009/0183328 | A1 | 7/2009 | King |
| 2009/0272395 | A1 | 11/2009 | Carey |
| 2010/0043815 | A1 | 2/2010 | Levy et al. |
| 2010/0172688 | A1 | 7/2010 | Huang |
| 2010/0186771 | A1 | 7/2010 | Rahbar-Dehghan |
| 2010/0236571 | A1 | 9/2010 | Haziza |
| 2010/0239352 | A1 | 9/2010 | Huang |
| 2010/0300474 | A1 | 12/2010 | Tsai |
| 2010/0300479 | A1 | 12/2010 | Reishus et al. |
| 2010/0310298 | A1 | 12/2010 | Tsai |
| 2011/0223315 | A1 | 9/2011 | Lim et al. |
| 2011/0232016 | A1 | 9/2011 | Yu et al. |
| 2011/0270274 | A1 | 11/2011 | Hull, Jr. |
| 2012/0024308 | A1 | 2/2012 | Giron et al. |
| 2012/0111350 | A1 | 5/2012 | Finfrock |
| 2012/0124758 | A1 | 5/2012 | Sabisch et al. |
| 2012/0152272 | A1 | 6/2012 | Solovey |
| 2012/0260931 | A1 | 10/2012 | Martin et al. |
| 2012/0298130 | A1 | 11/2012 | Telwar et al. |
| 2012/0304410 | A1 | 12/2012 | Chang |
| 2013/0056016 | A1 | 3/2013 | Guay et al. |
| 2013/0098382 | A1 | 4/2013 | Martin et al. |
| 2013/0125921 | A1 | 5/2013 | Celia |
| 2014/0166041 | A1 | 6/2014 | King |
| 2015/0034113 | A1 | 2/2015 | Yamagishi et al. |
| 2015/0265039 | A1 | 9/2015 | Godin et al. |
| 2015/0272301 | A1 | 10/2015 | Schreiber et al. |
| 2016/0083153 | A1 | 3/2016 | Apodaca |
| 2016/0302560 | A1 | 10/2016 | Takata et al. |
| 2016/0324306 | A1 | 11/2016 | Martin et al. |
| 2017/0000251 | A1 | 1/2017 | Machiorlette et al. |

OTHER PUBLICATIONS

Written Opinion of the International Searching Authority, dated Oct. 31, 2012, from corresponding International Application No. PCT/US2012/033703.
EM 291562-0005 Registered Design Application, (Shun-I Cheng) Apr. 5, 2005, online, retrieved on Jun. 21, 2012, Retrieved from the Community Design Database of the Office for Harmonization in the Internal Market using the Internet: URL: http://oami.europa.eu.
European Search Report, dated Aug. 18, 2015, from corresponding European Patent Application No. 12771979.7.
Final Office Action, dated Apr. 30, 2019, from corresponding U.S. Appl. No. 15/073,584.
Final Office Action, dated Aug. 11, 2014, from corresponding U.S. Appl. No. 13/087,212.
Final Office Action, dated Dec. 28, 2012, from corresponding Design U.S. Appl. No. 29/412,614.
Final Office Action, dated Feb. 26, 2015, from corresponding U.S. Appl. No. 13/715,781.
Final Office Action, dated Jul. 11, 2013, from corresponding U.S. Appl. No. 13/087,212.
Final Office Action, dated Jun. 28, 2019, from corresponding U.S. Appl. No. 15/281,293.
Final Office Action, dated Mar. 12, 2014, from corresponding U.S. Appl. No. 13/715,781.
Final Office Action, dated Oct. 10, 2014, from corresponding U.S. Appl. No. 13/955,817.
Final Office Action, dated Oct. 10, 2019, from corresponding U.S. Appl. No. 15/073,584.
Final Office Action, dated Sep. 18, 2015, from corresponding U.S. Appl. No. 13/087,212.
FR 976908 Registered Design Application, FUCHS VITRAC, Mar. 20, 1998, online, retrieved on Jun. 30, 2012, Retrieved from the Design Database o the Institut National de la Propriete Industrielle using the Internet: URL: http://bases-modeles.inpi.fr.
International Preliminary Report on Patentability, dated Oct. 24, 2013, from corresponding International Application No. PCT/US2012/033703.
International Search Report, dated Dec. 15, 2016, from corresponding International Application No. PCT/US2016/054674.
International Search Report, dated Oct. 31, 2012, from corresponding International Application No. PCT/US2012/033703.
Notice of Allowance, dated Dec. 16, 2016, from corresponding U.S. Appl. No. 29/516,895.
Notice of Allowance, dated Dec. 20, 2019, from corresponding U.S. Appl. No. 15/281,293.
Notice of Allowance, dated Feb. 22, 2013, from corresponding Design U.S. Appl. No. 29/412,614.
Notice of Allowance, dated Jan. 17, 2017, from corresponding Design U.S. Appl. No. 29/540,966.
Notice of Allowance, dated Jul. 18, 2016, from corresponding U.S. Appl. No. 13/955,817.
Notice of Allowance, dated Sep. 18, 2012, from corresponding Design U.S. Appl. No. 29/412,609.
Office Action, dated Apr. 15, 2015, from corresponding U.S. Appl. No. 13/955,817.
Office Action, dated Aug. 15, 2013, from corresponding U.S. Appl. No. 13/715,781.
Office Action, dated Dec. 14, 2018, from corresponding U.S. Appl. No. 15/281,293.
Office Action, dated Dec. 28, 2012, from corresponding U.S. Appl. No. 13/087,212.
Office Action, dated Dec. 6, 2018, from corresponding U.S. Appl. No. 15/264,263.
Office Action, dated Feb. 26, 2015, from corresponding U.S. Appl. No. 13/087,212.
Office Action, dated Jan. 29, 2014, from corresponding U.S. Appl. No. 13/087,212.
Office Action, dated Mar. 13, 2014, from corresponding U.S. Appl. No. 13/955,817.
Office Action, dated Oct. 1, 2014, from corresponding U.S. Appl. No. 13/715,781.
Office Action, dated Sep. 17, 2015, from corresponding U.S. Appl. No. 13/715,781.
Office Action, dated Sep. 18, 2018, from corresponding U.S. Appl. No. 15/073,584.
Office Action, dated Sep. 19, 2012, from corresponding Design U.S. Appl. No. 29/412,614.
Office Action, dated Sep. 2, 2015, from corresponding U.S. Appl. No. 13/955,817.

(56) References Cited

OTHER PUBLICATIONS

Restriction Requirement, dated Feb. 21, 2018, from corresponding U.S. Appl. No. 15/073,584.
Written Opinion of the International Searching Authority, dated Dec. 15, 2016, from corresponding International Application No. PCT/US2016/054674.

FIG. 5A
FIG. 5B

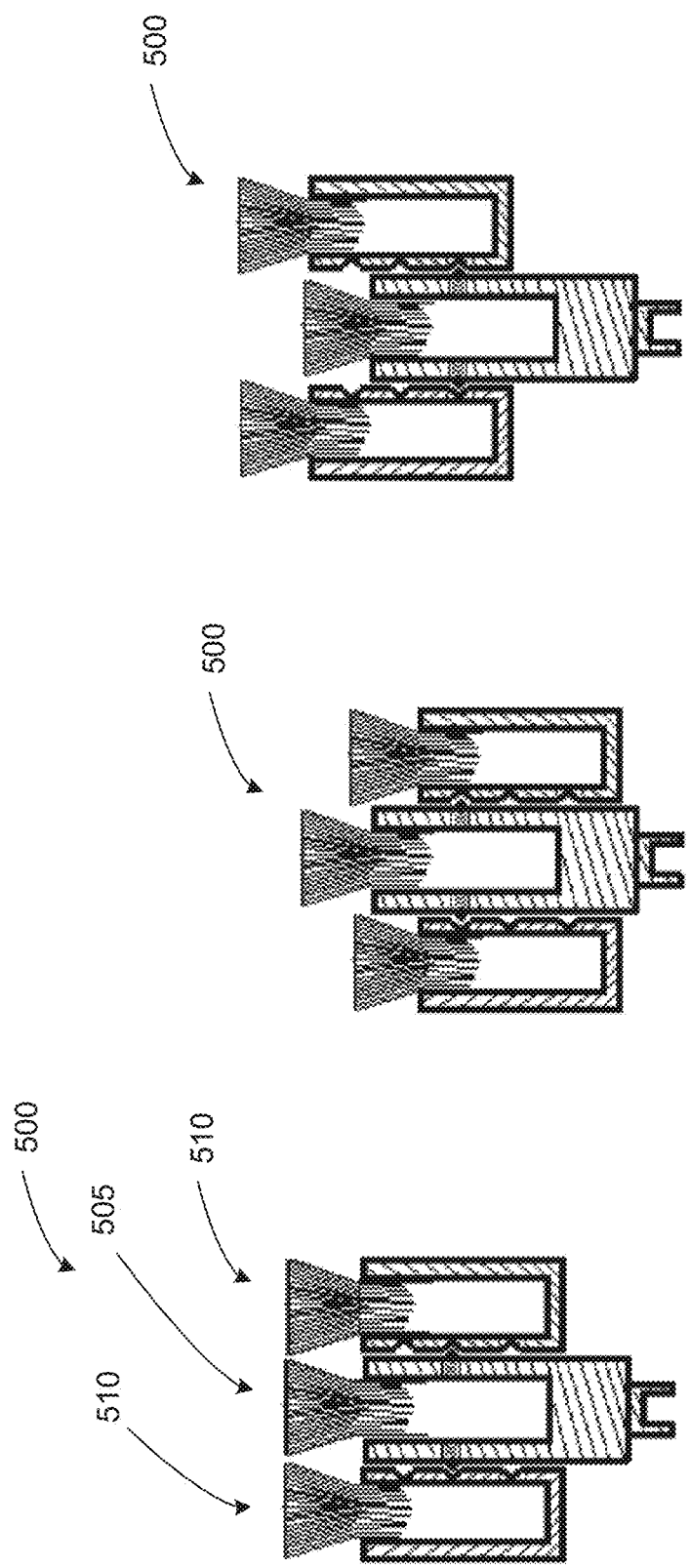

COMPUTERIZED COSMETICS BRUSHES

CROSS REFERENCE TO RELATED APPLICATIONS

This application is a continuation-in-part of U.S. Non-Provisional patent application Ser. No. 15/281,293, filed Sep. 30, 2016, entitled "Computerized Cosmetics Brushes", which claims the benefit of U.S. Provisional Patent Application No. 62/236,840, filed Oct. 2, 2015, entitled "Computerized Cosmetic Brushes". Each of the above-referenced patent applications is incorporated herein by reference in its entirety.

BACKGROUND

People may desire easier and more effective ways to apply cosmetics. Accordingly there is a need for improved systems and methods to address these issues.

SUMMARY

In various embodiments, a computerized makeup brush includes one or more sensors (e.g., pressure sensors, gyroscopes, accelerometers, etc.) within or on the motorized handle (e.g. can be eternally coupled to the motorized handle) and/or one or more of the replaceable brush heads that communicate with the makeup brush's on-board computer system and/or an external computing device (e.g., in the manner discussed above). In particular embodiments, the one or more sensors comprise a gyroscope and an accelerometer. In some embodiments, the one or more sensors comprise a magnetometer. In some embodiments, the one or more sensors are embedded in the handle of the makeup brush.

In various embodiments, a computerized makeup brush comprises (1) a computerized brush handle having a first end and a second end. A brush head has a plurality of bristles, wherein an end of the brush head is removably attached adjacent the first end of the handle. In various embodiments, the computerized handle further comprises one or more computer processors, memory operatively coupled to the one or more processors, and one or more sensors that are operatively coupled to the one or more processors. In some embodiments, the one or more sensors are adapted to sense the movement of the makeup brush relative to a particular portion of the user's body when the makeup brush is used to apply makeup to the particular portion of the user's body. Additionally, the one or more processors are adapted record data representing the movement of the makeup brush relative to the particular portion of the user's body over a particular period of time as the makeup brush is used to apply makeup to the particular portion of the user's body, and to save the recorded movement of the makeup brush to the memory.

In various embodiments, the one or more processors is adapted to facilitate the transmission of the data representing the movement of the makeup brush to an external computing system so that the external computing system may use the data to generate and display, to a user, a visual representation of the movement of the makeup brush over the particular period of time. In some embodiments, the external computing system comprises a handheld computing device that is adapted for running executable software to generate and display the visual representation of the movement of the makeup brush over the particular period of time. In various embodiments, the visual representation of the movement of the makeup brush depicts the movement of the makeup brush relative to the particular portion of the user's body over the particular period of time. In other embodiments, the visual representation comprises a visual representation of the particular portion of the user's body and a moving visual representation of the makeup brush as the makeup brush applies makeup to the particular portion of the user's body over the particular period of time. In still other embodiments, the visual representation of the makeup brush comprises an animated representation of the makeup brush that has been generated based, at least in part, on the recorded data. In some embodiments, the visual representation of the particular portion of the user's body comprises a computer-generated representation of the particular portion of the user's body. In still other embodiments, the visual representation of the particular portion of the user's body comprises an image of the particular portion of the user's body.

In various embodiments, the one or more sensors comprise a camera that is operably connected to the one or more processors so that the image of the particular portion of the user's body is an image that was captured by the camera during the particular period of time. In various embodiments, the computerized makeup brush comprises a camera that is operably connected to the one or more processors, and the visual representation of the particular portion of the user's body comprises a video of the particular portion of the user's body taken by the camera over the particular period of time. In some embodiments, the visual representation of the movement of the makeup brush is a graphical animation of the movement of the makeup brush that is used, in conjunction with the video, to display an enhanced reality depiction of the movement of the makeup brush relative to the particular portion of the user's body over the particular period of time.

In various embodiments, a computer-implemented method of training a user to effectively apply makeup using a computerized makeup brush comprises receiving, from a computerized makeup brush that comprises one or more sensors for sensing the movement of the makeup brush relative to a particular portion of a user's body, data representing a movement of the makeup brush relative to the particular portion of the user's body over a particular period of time as the makeup brush is used to apply makeup brush to the particular portion of the user's body, and using the data to generate and display, to a user, a visual representation of the movement of the makeup brush over the particular period of time. In various embodiments, the visual representation of the movement of the makeup brush depicts the movement of the makeup brush relative to the particular portion of the user's body over the particular period of time. In some of these embodiments, the visual representation comprises a visual representation of the particular portion of the user's body and a moving visual representation of the makeup brush as the makeup brush applies makeup to the particular portion of the user's body over the particular period of time. In some embodiments, the visual representation of the makeup brush comprises an animated representation of the makeup brush that has been generated based, at least in part, on the recorded data. In particular embodiments, the visual representation of the particular portion of the user's body comprises a computer-generated representation of the particular portion of the user's body. In other embodiments, the visual representation of the particular portion of the user's body comprises an image of the particular portion of the user's body.

In various embodiments, the one or more sensors comprises a camera that is operably connected to the one or more processors where an image of the particular portion of the user's body being displayed is an image that was captured by the camera during the particular period of time. In some embodiments, the visual representation of the particular portion of the user's body comprises a video of the particular portion of the user's body taken by the camera over the particular period of time. In particular embodiments, the visual representation of the movement of the makeup brush is a graphical animation of the movement of the makeup brush that is used, in conjunction with the video, to display an enhanced-reality depiction of the movement of the makeup brush relative to the particular portion of the user's body over the particular period of time.

A makeup brush movement tracking system, according to various embodiments comprises: (1) a housing defining an interior portion, the housing being structured to be attached to a makeup brush and to be kept attached to the makeup brush as the makeup brush is used by a user to apply makeup to the user or another individual; and (2) a motion sensing and computing system disposed within the housing's interior portion, the motion sensing and computing system comprising: (a) one or more computer processors; (b) memory operatively coupled to the one or more processors; and (c) at least one sensor that is operatively coupled to the one or more processors. In particular embodiments: (1) the at least one sensor is adapted to sense movement of the makeup brush relative to a particular portion of the user's body as the makeup brush is used to apply makeup to the particular portion of the user's body and while the housing is attached to the makeup brush; and (2) the one or more processors are adapted to: (a) record data representing the movement of the makeup brush relative to the particular portion of the user's body over a particular period of time as the makeup brush is used to apply makeup to the particular portion of the user's body, and (b) to coordinate saving the recorded movement of the makeup brush to memory. In various embodiments, the makeup brush comprises a handle having a first end and a second end and a brush head comprising a plurality of bristles, wherein an end of the brush head is attached adjacent the first end of the handle.

A computer-implemented method of training a user to effectively apply makeup using a makeup brush, according to various embodiments, comprises: (1) receiving, from a makeup brush movement tracking system that comprises at least one sensor for sensing the movement of the makeup brush relative to a particular portion of a user's body, data representing a movement of the makeup brush relative to the particular portion of the user's body over a particular period of time as the makeup brush is used to apply makeup to the particular portion of the user's body; and (2) using the data to generate and display, to a user, a visual representation of the movement of the makeup brush over the particular period of time, wherein the at least one sensor for sensing the movement of the makeup brush relative to the particular portion of the user's body is physically attached adjacent (e.g., to) an interior or exterior portion of the makeup brush.

A non-transitory computer-readable medium, according to various embodiments, stores computer-executable instructions for training a user to effectively apply makeup using a makeup brush, the computer-executable instructions comprising instructions for: (1) receiving, from a makeup brush movement tracking system that comprises at least one sensor for sensing the movement of the makeup brush relative to a particular portion of a user's body, data representing a movement of the makeup brush relative to the particular portion of the user's body over a particular period of time as the makeup brush is used to apply makeup to the particular portion of the user's body; and (2) using the data to generate and display, to a user, a visual representation of the movement of the makeup brush over the particular period of time, wherein the at least one sensor for sensing the movement of the makeup brush relative to the particular portion of the user's body is physically attached adjacent (e.g., to) an interior or exterior portion of the makeup brush.

BRIEF DESCRIPTION OF THE DRAWINGS

During the course of the discussion below, reference will be made to the accompanying drawings, which are not necessarily drawn to scale, and wherein:

FIGS. 5A-5B are a rotating makeup brush according to a further embodiment.

FIGS. 6A-6C are a cross-sectional view of a brush head, according to a particular embodiment.

DETAILED DESCRIPTION OF VARIOUS EMBODIMENTS

Figure 1:
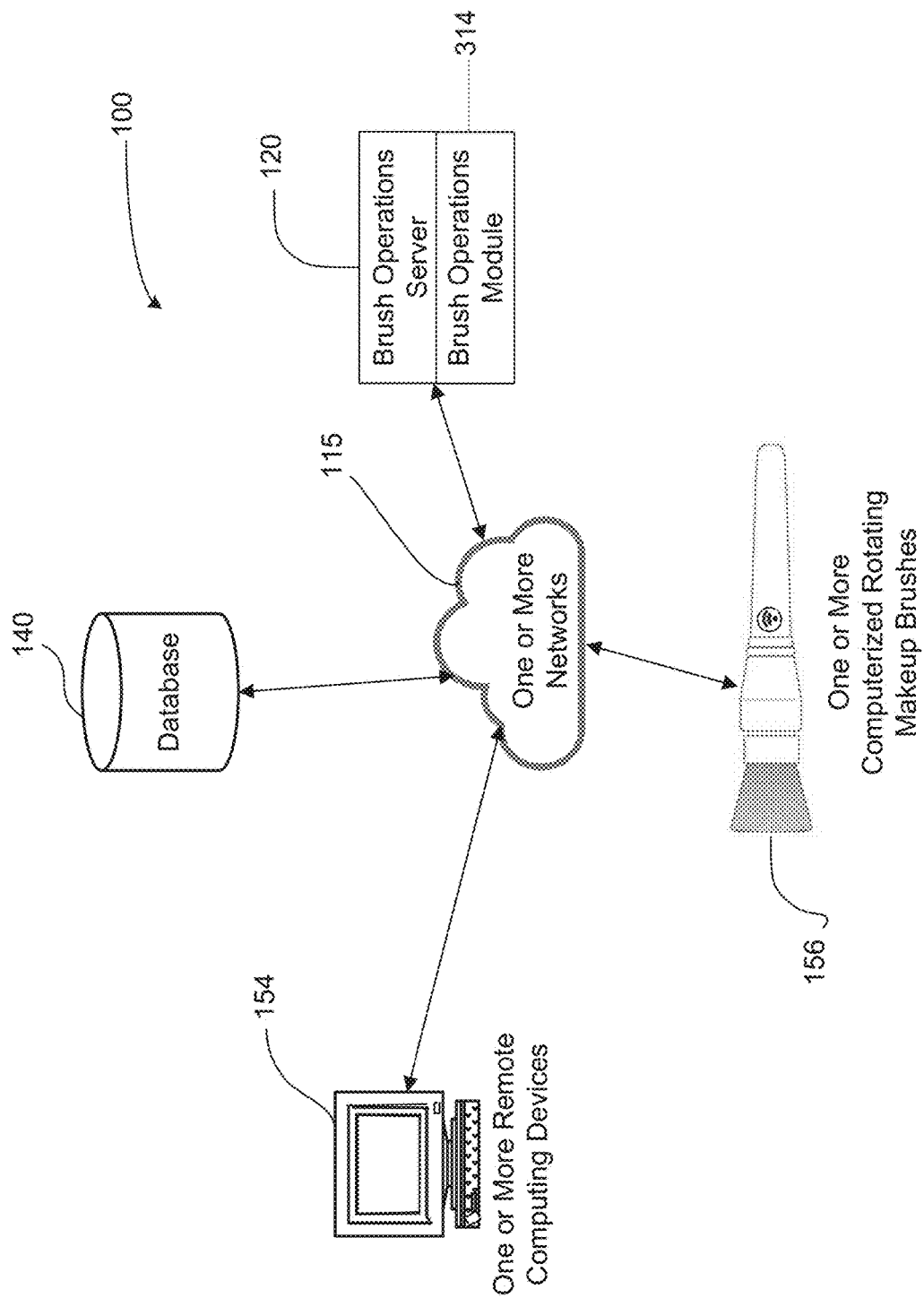
FIG. 1 is a block diagram of a computerized rotating makeup brush system in accordance with an embodiment of the present system.

Various embodiments of rotating makeup brushes are described in U.S. Published Patent Applications 2012/0260931, 2013/0098382, and 2014/0034075, which are hereby incorporated herein by reference in their entirety. A currently available commercial version of a general type of motorized rotating brush taught in these patent applications is the BLENDSMART® automatic rotating makeup brush (see www.blendsmart.com).

Exemplary Technical Platforms

As will be appreciated by one skilled in the relevant field, various aspects of the present system may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, compact disks, DVDs, optical storage devices, and/or magnetic storage devices.

Various embodiments are described herein with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. In the latter scenario, the remote computer may be connected to the user's computer through any type of network, including but not limited to: (1) a local area network (LAN); (2) a wide area network (WAN); (3) a cellular network; or (4) the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of a Computerized Rotating Makeup Brush System 100 according to particular embodiments. As may be understood from this figure, the Computerized Rotating Makeup Brush System 100 includes One or More Networks 115, a Brush operations server 120 that includes a Brush operations Module 314, a Brush operations Database 140, One or More Remote Computing Devices 154 (e.g., such as a smart phone, a tablet computer, a wearable computing device, a laptop computer, a desktop computer, a Bluetooth device, etc.), and One or More Computerized Rotating Makeup Brushes 156. In particular embodiments, the One or More Computer Networks 115 facilitate communication between the Brush operations server 120, the Brush operations Database 140, the One or More Remote Computing Devices 154, and the One or Computerized Rotating Makeup Brushes 156.

The one or more networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the One or More Remote Computing Devices 154 and the Brush operations server 120 may be, for example, implemented via a Local Area Network (LAN) or via the Internet.

Figure 2:
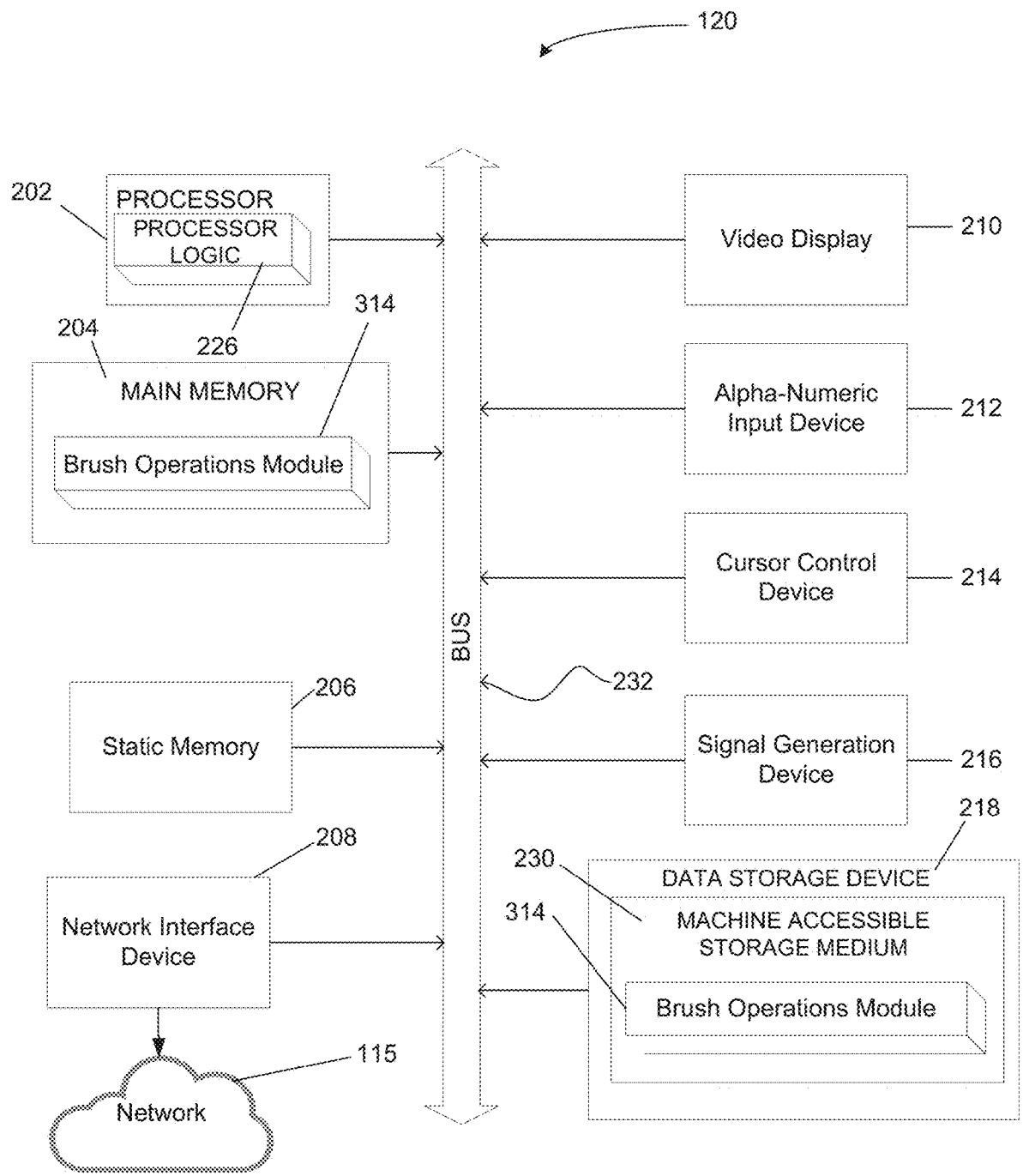
FIG. 2 is a block diagram of the brush operations server of FIG. 1.

FIG. 2 illustrates a diagrammatic representation of the architecture for the Brush operations server 120 that may be used within the Computerized Rotating Makeup Brush System 100. It should be understood that the computer architecture shown in FIG. 2 may also represent the computer architecture for any one of the One or More Remote Computing Devices 154, and One or More Computerized Rotating Makeup Brushes 156 shown in FIG. 1. In particular embodiments, the Brush operations server 120 may be suitable for use as a computer within the context of the Computerized Rotating Makeup Brush System 100 that is configured for receiving specific brush information and automatically adjusting the motor/brush's rotational speed, torque, and/or other characteristics.

In particular embodiments, the Brush Operations Server 120 may be connected (e.g., networked) to other computing devices in a LAN, an intranet, an extranet, and/or the Internet as shown in FIG. 1. As noted above, the Brush Operations Server 120 may operate in the capacity of a server or a client computing device in a client-server network environment, or as a peer computing device in a peer-to-peer (or distributed) network environment. The Brush operations server 120 may be a desktop personal computing device (PC), a tablet PC, a set-top box (STB), a Personal Digital Assistant (PDA), a cellular telephone, a web appliance, a network router, a switch or bridge, or any other computing device capable of executing a set of instructions (sequential or otherwise) that specify actions to be taken by that computing device. Further, while only a single computing device is illustrated, the term "computing device" shall also be interpreted to include any collection of computing devices that individually or jointly execute a set (or multiple sets) of instructions to perform any one or more of the methodologies discussed herein.

An exemplary Brush operations server 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit (CPU), or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The Brush Operations Server 120 may further include a network interface device 208. The Brush Operations Server 120 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computing device-readable medium) on which is stored one or more sets of instructions (e.g., the Brush operations Module 314) embodying any one or more of the methodologies or functions described herein.

The one or more sets of instructions may also reside, completely or at least partially, within the main memory 204 and/or within the processing device 202 during execution thereof by the Brush Operations Server 120—the main memory 204 and the processing device 202 also constituting computing device-accessible storage media. The one or more sets of instructions may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding, or carrying a set of instructions for execution by the computing device and that causes the computing device to include any one or more of the methodologies of the present invention. The term "computing device-accessible storage medium" should accordingly be understood to include, but not be limited to, solid-state memories, optical and magnetic media, etc.

Figure 3:
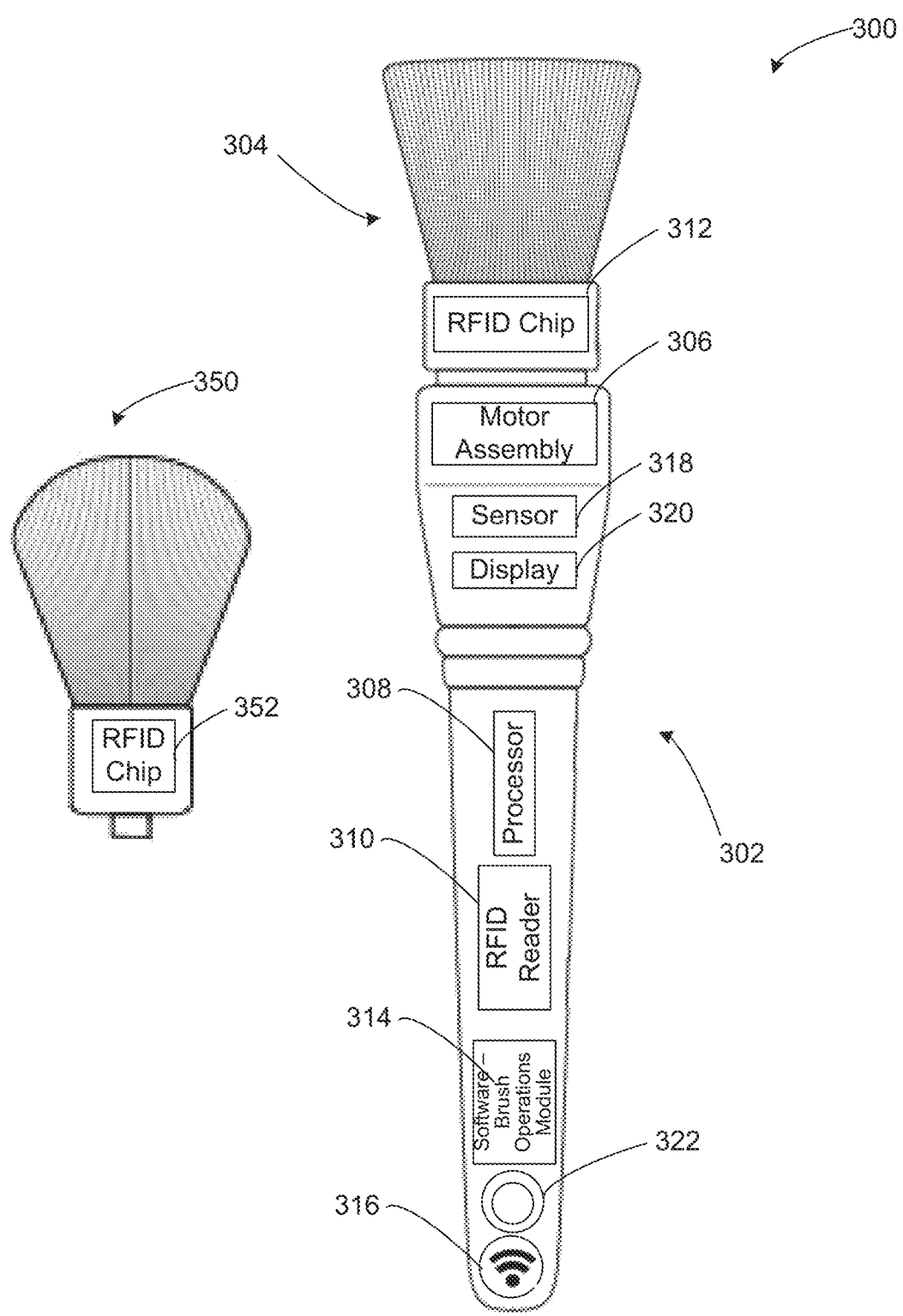
FIG. 3 is an exemplary computerized makeup brush for use in the computerized rotating makeup brush system of FIG. 1. In this embodiment, the brush is a rotating makeup brush. However, it should be understood that the brush could, alternatively, be a non-rotating brush or orbital rotating brush.

In particular embodiments, such as the embodiment shown in FIG. 3, such rotating makeup brushes may, for example, comprise a motorized handle portion 302 and a makeup brush head portion 304 that is adapted to be selectively attached to, and detached from, the motorized handle portion 302 so that the handle's motor 306 selectively rotates the makeup brush's head portion 304 relative to the handle portion 302. In alternative embodiments, the makeup brush head portion may be permanently affixed to the motorized handle portion. Various improvements to the structure and operation of rotating makeup brushes, such as the makeup brushes described in the above-referenced patent applications (as well as to other, non-rotating makeup brushes and other types of brushes) are described below.

Rotating Makeup Brush with Variable Brush Head Speed

Turning to FIG. 3, in various embodiments, the motorized handle portion 302 includes a motor assembly 306 that allows a user to selectively vary the speed of the handle's motor (e.g., before, during, or after use of the brush). The motor assembly 306 may include various gears that are selectively engageable to change the rotational speed of the motor. In other embodiments, the motor assembly 306 may include a switch having one or more discreet speed positions that varies the motor speed corresponding to the one or more discreet speed positions. In still other embodiments, the motor assembly 306 may have a variable switch (e.g., rheostat, computer controller, etc.) that varies the voltage to the motor. This may allow the user to customize the speed of the makeup brush head's 304 rotation, which may help the user in executing a particular makeup application technique or in applying a particular makeup, lotion or cream (e.g., shaving cream, etc.).

Computerized Rotating Makeup Brush with Brush Heads that Automatically Set Certain Operational Parameters of the Makeup Brush Still referring to FIG. 3, in particular embodiments, the motorized handle portion 302 is computerized—for example, the motorized handle portion 302 may include a computer processor 308 that is operably connected to suitable memory and one or more suitable input and/or output devices. In various embodiments, the computerized handle 302 comprises an indicium reader and at least one of the makeup brush heads comprises indium coupled to the brush head. For example, in particular embodiments, the computerized handle comprises an RFID reader 310, and at least one of the makeup brush's makeup brush heads 304, 350 comprises an integrated RFID chip 312 that is adapted to communicate with the handle's computing system via the RFID reader 310. In particular embodiments, the RFID chip 312 and the RFID reader 310 are adapted so that, when the makeup brush head 304, 350 is in close proximity with (e.g., attached to) the handle 302, the computerized handle 302 receives specific brush information from the RFID chip 312 (e.g., a particular makeup brush code). This specific brush information may be, for example: (1) a particular brush identifier code associated with the makeup brush head's specific brush type, model number, etc.; (2) a code that indicates a default rotational speed, torque setting, expected brush life (e.g., in hours, days, etc.) and/or rotational and or oscillating pattern for the brush; and/or (3) any other suitable information that effects the operation of the motorized handle 302. The computerized brush handle 302 may use this information, for example, to automatically adjust the motor/brush head's 304, 350 rotational speed and/or the torque that the motor 306 applies to the brush head 304, 350 at least partially in response to: (1) the brush head 304, 350 being attached adjacent (e.g., to) the handle 302; and/or (2) the brush head 304, 350 being moved adjacent the handle 302. This may facilitate the automatic adjustment of the brush head's speed, torque, density setting, brush configuration setting and/or other characteristics (e.g., rotational patterns) when the user removes one type of makeup brush head 304, 350 from the handle 302 and attaches an alternate makeup brush head 304, 350 to the handle 302 (e.g., the system may automatically detect the presence of the new makeup brush head 304, 350 and adjust the rotating makeup brush's parameters accordingly).

In certain embodiments, technologies other than RFID may be used to communicate information regarding the makeup brush head 304, 350 to the rotating makeup brush's computing system. For example, the makeup brush 300 may comprise a camera that may be used to take picture of the brush head 304, 350. The makeup brush's computing system (e.g., computer processor) may then apply Optical Character Recognition (OCR) techniques and/or image recognition techniques to the image in order to identify the brush head (e.g., the type, model, and/or serial number of the brush head). The makeup brush's computer system may then determine a preset set of brush parameters from, for example, a suitable data structure (e.g., lookup table) stored in the memory of the makeup brush's computer system and set the brush's parameters and/or other information to match the determined set of brush parameters. This may, for example, allow the makeup brush to operate in a manner that is optimized for the brush head 304, 350 that is currently attached to the makeup brush's handle. For example, the system may set the computer system's parameters so that the makeup brush's motor rotates the brush head 304, 350 at a certain speed or torque that is optimal for that brush head 304, 350.

The parameters may also indicate a brush life for the brush, which the makeup brush's computer system (or other computer system) may use to determine when to alert a user that it is time to change the brush head (as discussed elsewhere herein). The parameters may also indicate a recommended cleaning cycle for the brush, which the makeup brush's computer system (or other computer system) may use to determine when to alert a user that it is time to clean the brush head (as discussed elsewhere herein).

While the above techniques describe setting the rotating makeup brush's operational parameters in response to information received from, or about, the makeup brush's current brush head, the system may also use similar techniques to set the rotating makeup brush's operational parameters in response to other information, or combinations of different types of information. For example, the makeup brush system may be adapted to receive information regarding makeup that the user is currently using the makeup brush to apply, and to use this makeup information (optionally in combination with information regarding the makeup brush head that is currently operationally attached to the makeup brush's handle) to determine and set the makeup brushes' operational parameters. For example, the system may reference a data structure stored in the system's memory to identify one or more operational parameters (e.g., brush head speed, torque, brush density setting, brush configuration setting, and/or one or more rotational patterns/algorithms that the brush should be operated in) that are ideal for using the current brush head with the makeup that the user is currently applying. The system may then set the makeup brushes' operational parameters to match the identified operating parameters.

It should be understood that, while the above steps describe using a camera or RFID reader associated with the makeup brush to identify the makeup brush head 304, 350 and/or makeup to be used with the makeup brush, alternatively, a remote computing device (e.g., the user's smartphone or tablet computer that is in communication with the rotating makeup brush's onboard computer system) may be used to execute one or more aspects of the functionality discussed above. Also, in various embodiments, the system may be adapted to allow a user to manually enter information regarding the makeup brush head and/or makeup to be used.

Computerized Makeup Brush with Interchangeable Heads and "Change Brush" or "Clean Brush" Indicator In particular embodiments, the computerized makeup brush system may be adapted to monitor the amount of time that a particular makeup brush head has been used and, at least partially in response to the system determining that the makeup brush head has been used for at least a threshold amount of time: (1) generate an alert to the user indicating that the user should replace the brush head 304; (2) facilitate automatically re-ordering the brush head 304; and/or (3) generate an alert to the user indicating that the user should clean the brush head 304. In particular embodiments, the system may determine the threshold period of time based, at least in part, on the model of the brush, which the system may determine in any suitable way, such as the ways discussed elsewhere in this patent application.

As an example, in the embodiments discussed above, each respective RFID chip 312 may include a unique identifier for its respective makeup brush and the computerized handle includes software 314 may be adapted to monitor and/or approximate the amount of time (e.g., hours, minutes, etc.) that the makeup brush is used and/or the amount of wear on the brush. For example, the software 314 may track: (1) the amount of time that the particular brush 300 has been in active use (e.g., the amount of time that the motor 306 has rotated the brush head portion 304 relative to the handle 302); (2) the amount of time that the particular brush 300 has been attached to the brush handle 302; and/or (3) the amount of power used by the brush 300 when the brush head portion 304 was mounted to the brush handle 302. In particular embodiments, the computerized brush handle 302 may be adapted to generate an alert to the user in response to the handle's on-board computer 308 (or another computer) determining that one or more use thresholds has been reached or exceeded (e.g., in response to determining that the particular brush has been actively used for more than predetermined number of minutes (e.g., more than 120 minutes)). The alert may be any suitable alert that may be used to indicate, to the user, that it is time to change the makeup brush head 304. In particular embodiments, the computerized handle 304 may include suitable hardware 316 for wireless communications and may, in response to determining that one or more use thresholds has been reached or exceeded: (1) send an electronic communication to a computerized device associated with the user instructing the user to replace or clean their makeup brush head 304; (2) automatically facilitate re-ordering the brush via the user's account from a suitable on-line retailer, such as Amazon.com; and/or (3) take any other suitable action.

Computerized Makeup Brush that is Configured for Tracking the Motion and/or Particular Method Use of the Makeup Brush (e.g., for Training Purposes)

In further embodiments, the computerized makeup brush 300 includes one or more sensors 318 (e.g., pressure sensors, gyroscopes, accelerometers, etc.) within or on the motorized handle (e.g. can be eternally coupled to the motorized handle) 302 and/or one or more of the replaceable brush heads 304, 350 that communicate with the makeup brush's on-board computer system 308 and/or an external computing device 154 (e.g., in the manner discussed above). In particular embodiments, the one or more sensors 318 comprise a gyroscope and an accelerometer. In some embodiments, the one or more sensors 318 comprise a magnetometer. In some embodiments, the one or more sensors 318 are embedded in the handle of the makeup brush.

In particular embodiments, the makeup brush 300 or the external computing device 154 is adapted to receive data from the one or more sensors 318 and to use the data to assess how the makeup brush 300 is being used to apply makeup (e.g., how the makeup brush is being moved adjacent the user's body, how it is touching (or angled) with respect to the user's face, or how much pressure is being asserted when applying the makeup to the user's body). The makeup brush's on-board computer system 308 and/or the external computing device 154 may then, at least partially based on this assessment: (1) provide feedback to the user (e.g., via a suitable computer display 320 on the brush's handle or via an external computer display, via audio feedback, via an electronic message, or via any other suitable communication) regarding their makeup application techniques (e.g., by showing the user by way of a video "avatar" that mimics or documents the physical motions and techniques of the user by way of a video or hologram; by providing positive feedback for good performance, or one or more suggestions on how to improve their application techniques); (2) modify the rotational motion of the brush head portion 304 to improve the performance of the makeup brush 300 based on the current conditions (e.g., the current motion of the hand that is controlling the brush 300 or the pressure of the brush on the face—so if too much pressure, it will know to speed it up to counteract the resistance of the added pressure; or perhaps provide an audio or physical warning e.g., a blinking light, a vibration, a sound, or even stop the brush head if it happens to be a spinning, vibrating or otherwise non-stationary brush head); (3) provide feedback to a makeup application coach who will then train the user on how to better use the motorized rotating makeup brush 300 to apply makeup; and/or (4) provide feedback to the user regarding which makeup products would best suit their makeup application style.

In various embodiments of standard non-spinning brushes and also in motorized brush handles, the system may be configured to capture the motion that a professional uses on a person while using the brush, so that person can learn the technique. For example, in various embodiments, the person may watch a video playback of the professional applying makeup to the person. In other embodiments, a professional or other user may create and share a captured makeup application technique using the computerized spinning or non-spinning brush and share the technique with other users over a network or other marketplace where techniques can be shared.

In various embodiments, a computerized makeup brush comprises (1) a computerized brush handle 302 having a first end and a second end. A brush head 304 has a plurality of bristles, wherein an end of the brush head is removably attached adjacent the first end of the handle. In various embodiments, the computerized handle 302 further comprises one or more computer processors 308, memory operatively coupled to the one or more processors 308, and one or more sensors 318 that are operatively coupled to the one or more processors 308. In some embodiments, the one or more sensors 318 are adapted to sense the movement of the makeup brush 300 relative to a particular portion of the user's body when the makeup brush 300 is used to apply makeup to the particular portion of the user's body. Additionally, the one or more processors 308 are adapted record data representing the movement of the makeup brush 300 relative to the particular portion of the user's body over a particular period of time as the makeup brush 300 is used to apply makeup to the particular portion of the user's body, and to save the recorded movement of the makeup brush to the memory.

In various embodiments, the one or more processors 308 is adapted to facilitate the transmission of the data representing the movement of the makeup brush to an external computing system 154 so that the external computing system may use the data to generate and display, to a user, a visual representation of the movement of the makeup brush over the particular period of time. In some embodiments, the external computing system 154 comprises a handheld computing device that is adapted for running executable software to generate and display the visual representation of the movement of the makeup brush 300 over the particular period of time. In various embodiments, the visual representation of the movement of the makeup brush depicts the movement of the makeup brush relative to the particular portion of the user's body over the particular period of time. In other embodiments, the visual representation comprises a visual representation of the particular portion of the user's body and a moving visual representation of the makeup brush as the makeup brush 300 applies makeup to the particular portion of the user's body over the particular period of time. In still other embodiments, the visual representation of the makeup brush comprises an animated representation of the makeup brush that has been generated based, at least in part, on the recorded data. In some embodiments, the visual representation of the particular portion of the user's body comprises a computer-generated representation of the particular portion of the user's body. In still other embodiments, the visual representation of the particular portion of the user's body comprises an image of the particular portion of the user's body.

In various embodiments, the one or more sensors 318 comprise a camera that is operably connected to the one or more processors so that the image of the particular portion of the user's body is an image that was captured by the camera during the particular period of time. In various embodiments, the computerized makeup brush 300 comprises a camera that is operably connected to the one or more processors, and the visual representation of the particular portion of the user's body comprises a video of the particular portion of the user's body taken by the camera over the particular period of time. In some embodiments, the visual representation of the movement of the makeup brush is a graphical animation of the movement of the makeup brush 300 that is used, in conjunction with the video, to display an enhanced reality depiction of the movement of the makeup brush relative to the particular portion of the user's body over the particular period of time.

In various embodiments, a computer-implemented method of training a user to effectively apply makeup using a computerized makeup brush 300 comprises receiving, from a computerized makeup brush 300 that comprises one or more sensors 318 for sensing the movement of the makeup brush relative to a particular portion of a user's body, data representing a movement of the makeup brush relative to the particular portion of the user's body over a particular period of time as the makeup brush is used to apply makeup brush to the particular portion of the user's body, and using the data to generate and display, to a user, a visual representation of the movement of the makeup brush over the particular period of time. In various embodiments, the visual representation of the movement of the makeup brush 300 depicts the movement of the makeup brush relative to the particular portion of the user's body over the particular period of time. In some of these embodiments, the visual representation comprises a visual representation of the particular portion of the user's body and a moving visual representation of the makeup brush as the makeup brush applies makeup to the particular portion of the user's body over the particular period of time. In some embodiments, the visual representation of the makeup brush comprises an animated representation of the makeup brush that has been generated based, at least in part, on the recorded data. In particular embodiments, the visual representation of the particular portion of the user's body comprises a computer-generated representation of the particular portion of the user's body. In other embodiments, the visual representation of the particular portion of the user's body comprises an image of the particular portion of the user's body.

In various embodiments, the one or more sensors 318 comprises a camera that is operably connected to the one or more processors where an image of the particular portion of the user's body being displayed is an image that was captured by the camera during the particular period of time. In some embodiments, the visual representation of the particular portion of the user's body comprises a video of the particular portion of the user's body taken by the camera over the particular period of time. In particular embodiments, the visual representation of the movement of the makeup brush is a graphical animation of the movement of the makeup brush 300 that is used, in conjunction with the video, to display an enhanced-reality depiction of the movement of the makeup brush relative to the particular portion of the user's body over the particular period of time.

In particular embodiments, the computerized makeup brush 300 is adapted to communicate (e.g., via Bluetooth, Near Field Communications, beacon technologies, or any other suitable communication channel) with a remote computing device 154, such as a handheld computing device (e.g., a smartphone or tablet computer), a laptop computer, a remote computer, or any other suitable device. In particular embodiments, the computerized makeup brush 300 is adapted to be controlled remotely by the external computing device 154 (e.g., automatically by a computer program—e.g., an "app"—that is run on the external computing device 154, or by a computer program that controls the makeup brush 300 based on manual input—e.g., joystick and/or controller input—provided by a user of the external computing device). This may, for example, allow a user who is not experienced in applying makeup to have makeup applied to their body (e.g., face) by a remote makeup artist or other user, and/or by predetermined computer-controlled routine that, for example, may simulate the makeup application techniques of an experienced makeup artist.

Attachable Makeup Brush Movement Tracking System for Computerized and Non-Computerized Makeup Brushes While various embodiments described above discuss having a processor 308, memory, and one or more sensors 318 that are integrated into the physical structure of the makeup brush, in other embodiments, the processor 308, memory, and/or one or more of the sensors 318 may be part of a separate makeup brush movement tracking system that is configured to be selectively attached to any suitable makeup brush (e.g., a computerized or non-computerized makeup brush) to track the movement of the makeup brush as a user uses the makeup brush to apply makeup (e.g., to a particular body part of the user or another individual).

For example, in various embodiments, the makeup brush movement tracking system comprises: (1) a housing defining an interior portion, the housing being structured to be attached adjacent (e.g., to) a non-computerized or computerized makeup brush and to be kept attached adjacent the makeup brush as the makeup brush is being used by a user (e.g., to apply makeup to the user or to another individual); (2) a motion sensing and computing system disposed within the housing's interior portion, the motion sensing and computing system comprising: (a) one or more computer processors; (b) memory operatively coupled to the one or more computer processors; and (c) at least one sensor that is operatively coupled to the one or more computer processors, wherein: (i) the at least one sensor is adapted to sense movement of the makeup brush relative to a particular portion of the user's body as the makeup brush is used to apply makeup to the particular portion of the user's body, and (ii) the one or more processors are adapted to: (a) facilitate recording data representing the movement of the makeup brush relative to the particular portion of the user's body over a particular period of time as the makeup brush is used to apply makeup to the particular portion of the user's body; and (b) coordinate saving the recorded movement of the makeup brush to memory (e.g., within the makeup brush movement tracking system—for example, the system's onboard memory stored within housing—or other computer memory such as external memory and/or memory of a remote computer system).

In such an embodiment, the makeup brush may comprise a handle having a first end and a second end; and a brush head having a plurality of bristles, wherein the brush head is attached adjacent (e.g., to) the first end (the proximal end) of the handle and the second end of the handle is a distal end that is spaced apart from the handle's first, proximal end. Examples of such a makeup brush may be, for example, a standard, non-computerized foundation brush, stippling brush, powder brush, contour brush, etc. In other embodiments, the makeup brush may be a computerized makeup brush (e.g., with a motorized, rotating brush head).

In particular embodiments, the housing may be structured to allow a user to selectively attach the housing to a makeup brush so that the housing stays in a substantially fixed position relative to at least a portion of the makeup brush while the user uses the makeup brush to apply makeup (e.g., to themselves or another individual). For example, the makeup brush may include a fastener, such as a selectively-fastenable strap or adhesive strip, that allows a user to fasten the housing (e.g., either removably or permanently) to the makeup brush.

In particular embodiments, the housing may be shaped to allow a user to frictionally attach the housing to the makeup brush. For example, in particular embodiments, the housing defines an opening that is sized to receive a portion of the makeup brush's handle through the opening so that the housing is held in place adjacent the makeup brush's handle by the frictional engagement of an exterior portion of the makeup brush's handle and a portion of the housing that defines the opening. As a particular example, the housing may be substantially in the shape of a torus, with the circular central opening of the torus being sized so that it is larger than the smallest cross section of the makeup brush's handle (e.g., at the distal end of the handle), and so that it is smaller than the largest cross-section of the makeup brush's handle. This may, for example, allow a user to slide the housing into a fixed position on the makeup brush's handle by feeding the distal end of the brush through the opening in the housing until a portion of the housing adjacent the opening engages the makeup brush about a circumference of the brush handle and the housing stays in place relative to the makeup brush due to frictional forces between the housing and the brush handle.

Figure 7:
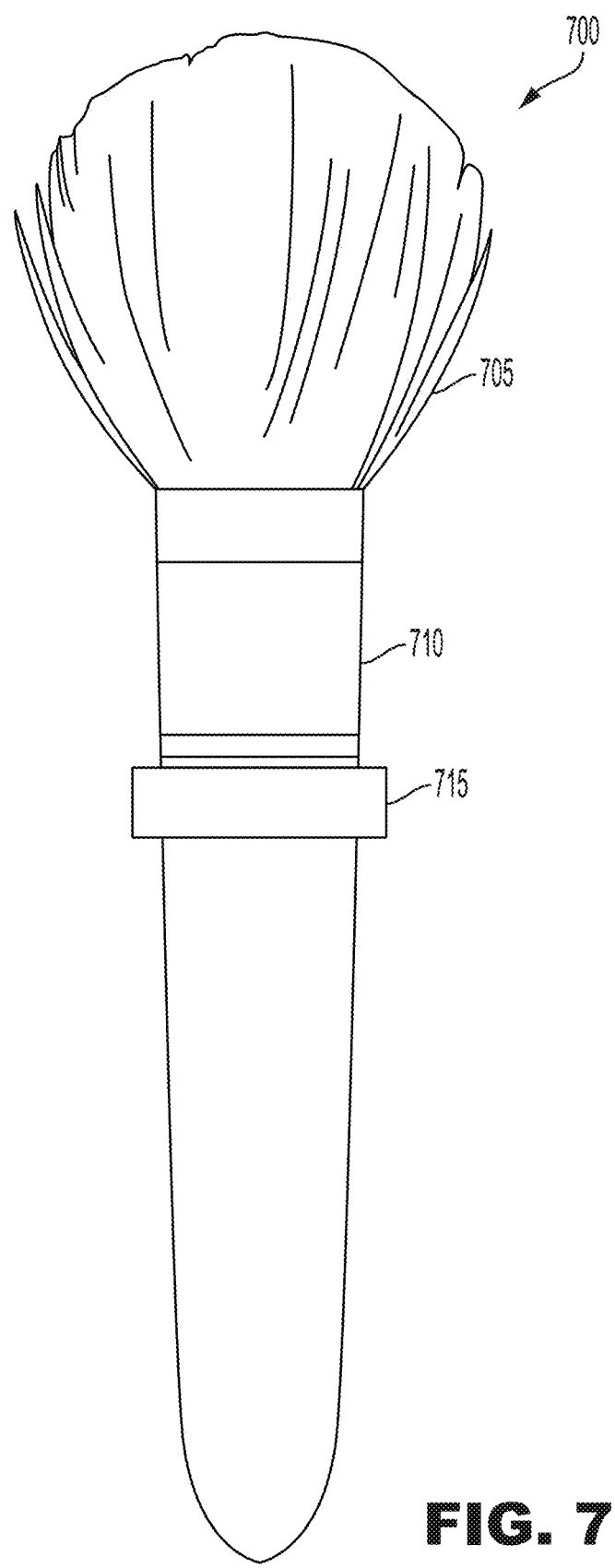
FIG. 7 shows a makeup brush with a detachable makeup brush movement monitoring system frictionally attached to its handle.

FIG. 7 shows an example of makeup brush assembly 700 that includes a makeup brush (in this case a standard, non-computerized makeup brush) having a handle 710 and a brush head 705 comprising a plurality of bristles. The brush head 705 is attached to a first end of the handle 710.

FIG. 7 further shows a makeup brush tracking system that is removably attached to the handle 710 of the makeup brush. In this example, the makeup brush tracking system comprises a torus shaped housing 715 that is attached to the brush's handle as described above. In this example, the housing 715 defines an interior portion in which the following are disposed: (1) a computer processor, (2) one or more sensors for monitoring the movement of the makeup brush (e.g. relative to a portion of a user's body as the user uses the makeup brush to apply makeup to that portion of the user's body), (3) computer memory, and/or (4) a wireless communications device (e.g., a Bluetooth communications device) that is configured to allow the makeup brush tracking system to communicate with an external computing device, such as a laptop computer, desktop computer, server, or smartphone.

This may, for example, allow the makeup brush tracking system to communicate, to the external computing device, data regarding the movement of the makeup brush relative to a portion of the user's body as the user uses the makeup brush to apply makeup to that portion of the user's body. In various embodiments, the external computing device may then use this data to generate and present information to the user regarding: (1) the user's performance in using the makeup brush to apply makeup; (2) one or more suggestions to the user to improve their performance in using the makeup brush to apply makeup; and/or (3) one or more visual representations of the user's tracked performance in applying the makeup and/or one or more visual representations of another user (real or simulated) using the makeup brush to apply makeup in a desirable (e.g., "correct") manner.

Although the attachable makeup brush movement tracking system described herein is described as including functionality to track the movement of a particular makeup brush, it should be understood that the system may be configured with other components and/or functionality, such as any suitable components/functionality described herein (e.g., in regard to other embodiments described herein).

System for Visually Tracking Makeup Brush Movement

As an alternative or addition to one or more of the embodiments described above, the system may include one or more cameras (e.g., external cameras) and one or more suitable processors that are adapted to capture the motion of a makeup brush (computerized or non-computerized) and that are adapted to use captured images from the one or more cameras to determine a sequence of movement of the makeup brush and to save the sequence of movement to memory. The system may be further adapted to automatically analyze the sequence of movement and/or to convey the brush's movement to a user, for example, in any manner discussed herein. The system may use any suitable known technique to capture images of the brush as it is used to apply makeup to an individual and to process those images to determine the movement relative to the individual's face.

Computerized Makeup Brush that is Configured to Visually Assess the Quality of the Application of Makeup to the User's Body In further embodiments, the computerized makeup brush 300 and/or the external computing device 154 comprises one or more cameras 322, connected wired or wirelessly thereto, are configured for taking one or more images of a body surface before, as, or after the makeup brush is used to apply makeup to the body surface of the user. The computerized makeup brush 300 and/or external computing device may use the captured visual information to, for example: (1) determine whether the makeup that is being applied to the user's body surface is an appropriate match for their skin color (e.g., by comparing a skin tone in a captured image to the tone of the makeup applied to the skin); (2) determine whether the makeup is being applied in an acceptable amount (e.g., applied sufficiently to cover the area but not too heavy as to cake); and/or (3) determine whether the user is using correct techniques (e.g., correct movement of the makeup brush 300 relative to the user's body surface) to apply the makeup. The computerized makeup brush 300 and/or external computing device 154 may then, at least partially in response to receiving and analyzing this data, communicate one or more appropriate recommendations to the user for improving the application of makeup to the user's skin.

In various embodiments, a computerized makeup brush 300 comprises a handle 302 having a first end and a second end, a plurality of bristles (e.g., the brush head 304) attached adjacent the first end of the handle 302, one or more computer processors 308 coupled to the handle 302 (e.g., attached to, received in a cavity formed therein, etc.), memory operatively coupled to the one or more processors, and one or more cameras 322 operatively coupled to the one or more computer processors 308. In various embodiments, the one or more cameras 322 are adapted to capture one or more images of a particular part of a user's body as a user uses the makeup brush to apply makeup to the particular part of the user's body. In some embodiments, the one or more computer processors 308 are adapted to store the one or more captured images in the memory of the computerized makeup brush 300.

In various embodiments, the one or more processors 308 are adapted to automatically determine, based on the one or more images, whether the user has used the makeup brush to execute one or more particular makeup application techniques to apply makeup to the particular part of the user's body. For example, the one or more processors 308 are adapted for, in response to determining that the user has not used the makeup brush to execute the one or more particular makeup application techniques to apply makeup to the particular part of the user's body, generating an alert to a user. In particular embodiments, the one or more processors 308 are adapted to automatically determine, based on the one or more images, whether the color of the makeup being applied by the makeup brush is a suitable match for the user's skin. In some embodiments, the one or more processors 308 are adapted to determine whether the color of the makeup being applied by the makeup brush are a suitable match for the user's skin by comparing a color of the user's skin, as determined from the one or more images, with a color of the makeup after the makeup has been applied to the user's skin, as determined from the one or more images.

In various embodiments, the one or more processors 308 are adapted to automatically determine, based on the one or more images, whether the makeup brush are uniformly applying makeup to the particular part of the user's body. In particular embodiments, the one or more processors 308 are adapted to determine whether the makeup brush is uniformly applying makeup to the particular part of the user's body by comparing a first color of makeup applied by the makeup brush to a first portion of the particular part of the user's body with a second color of makeup applied by the makeup brush to a second portion of the particular part of the user's body. In response to determining that the first and second colors are substantially different, the one or more processors 308 determine that the makeup brush is not uniformly applying makeup to the particular part of the user's body, and in response to determining that the first and second colors are not substantially different, the one or more processors 308 determine that the makeup brush is uniformly applying makeup to the particular part of the user's body.

In various embodiments, the one or more processors 308 are adapted to, in response to determining that the makeup brush is not uniformly applying makeup to the particular part of the user's body, generate an alert to the user. In other embodiments, the one or more processors 308 are adapted to automatically determine, based on the one or more images, whether the makeup brush is currently applying a desired amount of makeup to the particular part of the user's body. In particular embodiments, the one or more processors 308 are adapted for, in response to determining that makeup brush is not currently applying a desired amount of makeup to the particular part of the user's body, generating an alert to a user. In other embodiments, the one or more processors 308 are adapted for determining whether the makeup brush is currently applying a desired amount of makeup based, at least in part, on the intensity of the color of makeup that has been applied to the particular part of the user's body. In some embodiments, the one or more processors 308 are adapted for determining the intensity of the color of makeup from the one or more images.

In various embodiments, the one or more processors 308 are adapted to facilitate the transmission of the one or more images to a remote computing device 154 that is adapted to automatically determine, based on the one or more images, whether the user has used the makeup brush 300 to execute one or more particular makeup application techniques to apply makeup to the particular part of the user's body. In some embodiments, the remote computing device 154 is adapted for, in response to determining that the user has not used the makeup brush to execute the one or more particular makeup application techniques to apply makeup to the particular part of the user's body, generating an alert to a user. In particular embodiments, the one or more processors 308 are adapted to facilitate the transmission of the one or more images to the remote computing device 154 that is adapted to automatically determine, based on the one or more images, whether the makeup brush is currently applying a desired amount of makeup to the particular part of the user's body. In various embodiments, the remote computing device 154 is adapted for, in response to determining that makeup brush is not currently applying a desired amount of makeup to the particular part of the user's body, generating an alert to a user. In some embodiments, the remote computing device 154 is adapted for determining whether the makeup brush is currently applying a desired amount of makeup based, at least in part, on the intensity of the color of makeup that has been applied to the particular part of the user's body. In some embodiments, the remote computing device 154 is adapted for determining the intensity of the color of makeup from the one or more images.

In particular embodiments, a computerized makeup brush 300 comprises a handle 302 having a first end and a second end, a plurality of bristles (e.g., brush head 304) attached adjacent the first end of the handle, one or more computer processors 308, memory operatively coupled to the one or more processors 308, and one or more makeup layer thickness sensors 318 and/or 322 operatively coupled to the one or more computer processors 308. One or more makeup layer thickness sensors 318 and/or 322 are adapted to sense the thickness of a layer of makeup that the makeup brush is applying, or has recently applied, to a particular portion of particular portion of a user's body, and the one or more computer processors 308 are adapted to store data regarding the thickness of the layer of makeup in the memory of the computerized makeup brush 300. In various embodiments, the at least one of the one or more makeup layer thickness sensors 318 and/or 322 is an ultrasonic sensor. In other embodiments, at least one of the one or more makeup layer thickness sensors 318 and/or 322 is a particle sensor that is adapted to determine a concentration of makeup particles adjacent the particular portion of the user's body. In still other embodiments, at least one of the one or more makeup layer thickness sensors 318 and/or 322 is a digital scent sensor that is adapted for determining a thickness of makeup based, at least in part, on the scent of the layer of makeup.

Computerized Makeup Brush that is Configured to Wirelessly Accept Firmware Updates In further embodiments, the computerized makeup brush 300 and/or the one or more remote computing devices 154 may include a wireless or wired connection between the devices that allows the one or more remote computing devices 154 to update firmware used by the computerized makeup brush. In this way, the computerized makeup brush can be updated to include new routines, new features, etc. by updating the software/firmware used by the computerized makeup brush 300.

Computerized Rotating Makeup Brush that is Configured not to Operate Properly with Non-Compliant Brush Heads In particular embodiments, the computerized makeup brush 300 (such as any embodiment of the computerized makeup brush described above) may be configured to only work with particular brush heads 304, 350. The computerized handle 302 may, for example, comprise an RFID reader 310, and each makeup brush head 304, 350 may comprise an integrated RFID chip 312, 352. The RFID chip 312, 352 may be configured to communicate with the RFID reader 310 by, for example, transmitting a particular code when the makeup brush head is placed on the computerized handle 302. In various embodiments, each particular brush head's RFID chip 312, 352 may be programmed with a unique code (e.g., unique to the particular brush head). In other embodiments, each particular type of brush head 304, 350 may include a code that is unique to that particular type of brush head. The computerized handle 302 may determine, based at least in part on the particular code transmitted by the RFID chip 312, 352 in the makeup brush head 304, 350, whether the makeup brush head 304, 350 is an approved makeup brush head. In response to determining that the makeup brush head 304, 350 is an approved makeup brush head, the computerized makeup brush handle 302 may function normally, for example, by having its brush handle rotate the brush head 304, 350 and thereby enabling a user to rotationally apply makeup from the makeup brush head 304, 350 using the computerized, motorized handle 302. In response to determining that the makeup brush head 304, 350 is not an approved makeup brush head, the computerized makeup brush handle 302 is configured to disable the rotation feature of the computerized makeup brush handle such that the computerized makeup brush is inoperable for the purpose of using the computerized makeup brush's motor to rotationally apply makeup using the unapproved makeup brush head 304, 350.

In various embodiments, preventing the use of unapproved brush heads may, for example: (1) ensure that only brush heads of a particular quality are used with the computerized makeup brush (e.g., to ensure a positive customer experience); (2) limit an ability of a competitor to sell brush heads for the computerized makeup brush; (3) etc. In particular embodiments, the computerized handle 302 is configured to store (e.g., in local memory) a list of approved brush head codes for determining whether a particular brush head is an approved brush head. In various embodiments, the system is configured to update the list of approved brush heads (e.g., using any suitable technique). In other embodiments, this information may be stored and updated remotely and accessed, as needed by the makeup brushes' on board computing system.

A computer-controlled motorized makeup brush, according to various embodiments, comprises: (1) a motorized handle portion comprising an RFID reader, a computer-controller, and at least one motor configured to selectively cause at least a first portion of a makeup brush head to rotate about a central access of the computer-controlled motorized makeup brush; (2) a coupling assembly disposed adjacent an end of the motorized handle portion; and (3) a makeup brush head comprising a plurality of bristles and an RFID tag, wherein the makeup brush head is adapted to be selectively coupled to the motorized handle portion via the coupling assembly.

In particular embodiments, the computer-controller is configured to: (1) use the RFID reader to read the RFID tag to determine whether the makeup brush head is an approved makeup brush head; (2) in response to determining that the makeup brush head is an approved makeup brush head, enabling a user to rotationally apply makeup from the makeup brush head using the computer-controlled motorized makeup brush by controlling the at least one motor to cause the makeup brush head to rotate about the central access of the computer-controlled motorized makeup brush; and (3) in response to determining that the makeup brush head an unapproved makeup brush head, disabling the at least one motor from causing the at least the first portion of a makeup brush head to rotate about the central access of the computer-controlled motorized makeup brush such that the computer-controlled motorized makeup brush is inoperable for the purpose of using the at least one motor to rotationally apply makeup using the unapproved makeup brush head.

In some embodiments, using the RFID reader to read the RFID tag to determine whether the makeup brush head is an approved makeup brush head comprises: (1) using the RFID reader to read a unique code associated with the RFID tag; and (2) comparing the unique code with one or more authorized codes stored in memory associated with the computer-controlled motorized makeup brush to determine whether the makeup brush head is an approved makeup brush head.

In various embodiments, the computer-controller is further configured for: (1) receiving, from a computing device, an updated listing of the one or more authorized codes; and (2) in response to receiving the updated listing of the one or more authorized codes, storing the updated listing in the memory. In various embodiments, the computer-controller is configured to receive the updated listing as part of a firmware update, such as in any way described above. In various embodiments, the computer-controller is configured for receiving the updated listing of the one or more authorized codes form the computing device via a suitable wireless or wired connected such as via, for example: (1) USB; (2) Ethernet; (3) WIFI; (4) Bluetooth; (5) NFC; and (6) any other suitable connection.

Computerized Rotating Makeup Brush with Charging Station

In various embodiments, the computerized makeup brush comprises at least one rechargeable battery (not shown) (e.g., Nickel Cadmium (NiCd), Nickel Metal Hydride (NiMH), Lithium Ion (Li Ion), Sealed Lead Acid (SLA) variations (AGM, Gel), or any other suitable rechargeable battery). In particular embodiments, the computerized makeup brush further comprises a charging station (not shown) (e.g., a charging base) configured to charge the rechargeable battery. In particular embodiments, the charging station is configured to charge the rechargeable battery using any suitable charging technique, such as inductive charging. In particular embodiments, the charging station is configured to support the rotating makeup brush in a substantially upright position while charging the rechargeable battery. In such embodiments, when the rotating makeup brush is in the substantially upright position, the bristles of the makeup brush are facing substantially upwards (e.g., relative to a support surface on which the charging station is placed) such that the bristles are not contacting any portion of the base or the support surface.

In still other embodiments, the charging station is configured to support the rotating makeup brush in a hanging position in which the rotating makeup brush: (1) is supported adjacent a portion of the rotating makeup brush such that the rotating makeup brush hangs with the makeup brush (e.g., and the bristles of the makeup brush) facing substantially downward toward the support surface; and (2) the makeup brush's rechargeable battery is charged via an inductive charging technique (e.g., or any other suitable charging technique) while the rotating makeup brush is in the hanging position. In various embodiments, the charging station is configured to support the rotating makeup brush in a parallel position relative to a support surface on which the charging station is placed. For example, the charging station may have one or more supports for holding and balancing the rotating makeup brush parallel relative to a support surface on which the charging station is placed. In such embodiments, when the rotating makeup brush is placed in the charging station, the bristles do not contact any portion of the charging station or the support surface.

A rechargeable motorized makeup brush according to various embodiments, comprises: (1) a motorized handle portion comprising a rechargeable battery and at least one motor configured to selectively cause at least a first portion of a makeup brush head to rotate about a central access of the rechargeable motorized makeup brush; (2) a coupling assembly disposed adjacent an end of the motorized handle portion; (3) a charging station comprising a base portion and a makeup brush support portion configured for supporting the rechargeable motorized makeup brush; and (3) a makeup brush head comprising a plurality of bristles, wherein the makeup brush head is adapted to be selectively coupled to the motorized handle portion via the coupling assembly. In various embodiments, the charging station is configured for providing an electrical charge to the rechargeable battery while the charging station is supporting the rechargeable motorized makeup brush on the makeup brush support portion.

The charging station may, for example, provide the electrical charge via alternating or direct current. In various embodiments, the charging station is configured for providing the electrical charge to the rechargeable battery using a suitable inductive charging technique (e.g., via electromagnetic induction), for example, through one or more inductive couplings. In particular embodiments, the charging station comprises at least a first induction to create an alternating electromagnetic field from within the charging station, and a second induction coil in the rechargeable motorized makeup brush takes power from the electromagnetic field and converts It back into electric current to charge the rechargeable battery. In various embodiments, the two indication coils (e.g., at least two induction coils) in proximity combine to form an electrical transformer. In still other embodiments, the charging station transmits power tot eh rechargeable battery via resonant inductive coupling.

Makeup Brush with Multi-Directional Brush Movement

Figure 4:
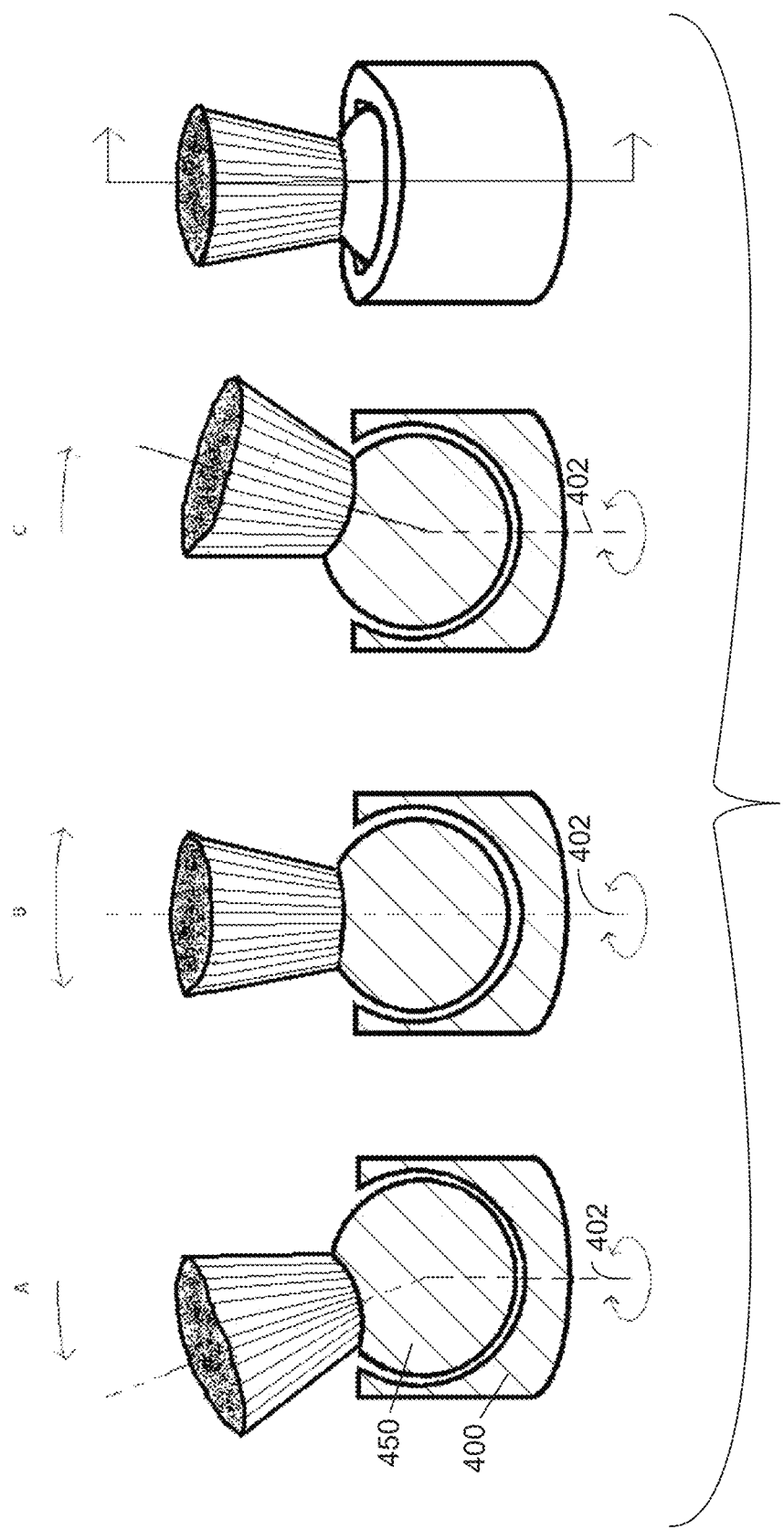
FIG. 4 is a cross-sectional view of a brush head according to a further embodiment.

In particular embodiments, such as the embodiment shown in FIG. 4, the makeup brush is configured to rotate as well as move laterally along a radius of the axis of rotation 402. In the embodiment shown in this figure, the makeup brush comprises an outer portion 400, a substantially spherical bristle support portion 450 disposed at least partially within the outer portion, and a plurality of bristles. In various embodiments, the bristle support portion 450 and outer portion 400 are connected via a ball/joint connection so that the bristle support portion 450 may rotate orbitally relative to the outer portion 400. In such embodiments, the bristle support portion 450 may be configured to sweep back and forth between position A and position C and/or other positions. In still other embodiments, the bristle support portion 450 may be configured to sweep back and forth between position A and position C while the makeup brush rotates about the axis of rotation. In other embodiments, the bristle support portion 450 is configured to selectively remain in position A, position B, or position C while rotating the makeup brush about its central axis. In various embodiments, the bristle support portion 450 is configured to sweep back and forth between positions A and C while the makeup brush (e.g., including both the outer portion 400 and the bristle support portion 450) is spinning about its central axis. In particular embodiments, the makeup brush (e.g., and/or the computerized handle) is configured to cause the bristles to move in any suitable manner relative to the computerized handle (not shown) while in operation, using, for example, any combination of rotation and sweeping movement. This may result in movement by the bristles such as, for example, a figure eight movement, rotation at an angle, or any other suitable movement.

In a particular embodiment, the bristle support portion may be configured to sweep back and forth between positions A and C while the makeup brush is substantially static (e.g. not rotating) in order to enable a user to apply makeup using a different technique. In particular embodiments, the bristle support portion 450 is maintained substantially within the outer portion 400 using any suitable means (e.g., one or more pins, one or more lips, one or more ridges, etc.) and moved relative to the axis rotation using any suitable means (e.g., one or more levers, one or more gears, one or more biasing mechanisms, etc.). In various embodiments, the makeup brush comprises a biasing mechanism for biasing the bristle support portion 450 toward position B.

A motorized makeup brush, according to particular embodiments, comprises: (1) a motorized handle portion; (2) a coupling assembly disposed adjacent an end of the motorized handle portion; (3) at least one motor disposed at least partially within the motorized handle portion; and (4) a makeup brush comprising a plurality of bristles that is adapted to be selectively coupled to the motorized handle portion via the coupling assembly. In particular embodiments, the at least one motor is configured to: (1) selectively cause at least a first portion of the makeup brush to rotate about a central access of the makeup brush; (2) selectively cause at least a second portion of the makeup brush to revolve abut a central access of the motorized handle portion; and (3) selectively cause the at least a third portion of the makeup brush to move laterally relative to the motorized handle portion. In various embodiments, the first portion, second portion and third portion of the makeup brush comprise the plurality of bristles.

In particular embodiments, the motorized makeup brush further comprises a gear assembly suitable translating a rotation of the at least one motor to cause at least the first portion of the makeup brush to rotate about a central access of the makeup brush, at least a second portion of the makeup brush to revolve abut a central access of the motorized handle portion, and the at least a third portion of the makeup brush to move laterally relative to the motorized handle portion. In various embodiments, the gear assembly comprises a suitable gear assembly for causing reciprocating motion, rotation, oscillation, revolution, or any other suitable movement of the makeup brush relative to the handle. The gear assembly may comprise, for example, (1) one or more gears; (2) one or more cranks; (3) one or more pistons; (4) one or more crankshafts; or (5) any other suitable components.

In various embodiments, the at least one motor comprises a first motor, a second motor, and a third motor. In particular embodiments: (1) the first motor is configured to selectively cause at least the first portion of the makeup brush to rotate about the central access of the makeup brush; (2) the second motor is configured to selectively cause at least a second portion of the makeup brush to revolve about a central access of the motorized handle portion; and (3) the third motor is configured to selectively cause at least the third portion of the makeup brush to move laterally relative to the motorized handle portion. In still other embodiments, the third motor is further configured to cooperate with the second motor to selectively cause at least the second portion of the makeup brush to revolve about the central axis of the motorized handle portion.

In various embodiments, the at least one motor comprises a multidirectional motor for transmitting motion to a moveable element in the makeup brush in at least two directions that are not collinear. In some embodiments, the multidirectional motor comprises: (1) a first motor that is friction coupled to the moveable element and transmits motion to the moveable element along a direction determined by the orientation of the first motor; and (2) a second motor operable to change the orientation of the first motor relative to the moveable element. In various embodiments, the multidirectional motor comprises a suitable motor described in U.S. patent Ser. No. 09/807,755 filed Oct. 26, 1998 and entitled "Multidirectional motors", which is hereby incorporated herein in its entirety.

Programmable/Recordable Brush Movements

In various embodiments, such as the embodiment discussed above that enables multidirectional brush movement, the computerized makeup brush is configured to enable a user to program the makeup brush 300 to perform a particular brush routine (e.g., a particular movement of the brush (e.g., and bristles) relative to the computerized handle). In such embodiments, a user may program the brush routine using a suitable computing device 154 (e.g., a smartphone, a tablet computer, an application running on the computerized makeup brush, a laptop or desktop computer, etc.) In particular embodiments, the system may enable the user to create a program to control any aspect of the brush movement such as, for example, the rotational speed, rotation direction, sweeping speed, etc. of the makeup brush). In various embodiments, the system is configured to enable a user to share the programed brush routine with one or more other users as well as utilize one or more brush routines programed by other users. This may, for example, allow an experienced makeup artist to create a program for later use by those who have less cosmetics experience, which may allow non-professional users to obtain a professional-quality makeup application without the physical involvement of an experienced professional.

In particular embodiments, the system may be adapted to allow a user to program the makeup brush by simply using the makeup brush to apply makeup to their own body (e.g., face), or to the body of another user. In various embodiments, the system may do this by: (1) using one or more of the makeup brush's onboard sensors (e.g., one or more accelerometers, gyroscopes, brush rotation sensors etc. to monitor and save, to memory, an indication of the physical movement of the makeup brush and brush head over a particular time, and then (2) using this saved information to create a program that will cause the makeup brush to recreate one or more of the recorded physical movements of the makeup brush and/or brush head. In particular embodiments, the system may be adapted to create an animated representation (e.g., via an avatar on a computer display screen or other display device) of the recorded movements.

In particular embodiments, the motorized makeup brush further comprises a computer controller configured to control the at least one motor to selectively cause at least the first portion of the makeup brush to rotate about a central access of the makeup brush, selectively cause at least the second portion of the makeup brush to revolve about a central access of the motorized handle portion, and selectively cause at least the third portion of the makeup brush to move laterally relative to the motorized handle portion.

In still other embodiments, the computer controller is configured to control the at least one motor to selectively cause at least the first portion of the makeup brush to rotate about a central access of the makeup brush, selectively cause at least the second portion of the makeup brush to revolve about a central access of the motorized handle portion, and selectively cause at least the third portion of the makeup brush to move laterally relative to the motorized handle portion such that the plurality of bristles move in a particular pattern relative to the motorized brush handle. In various embodiments, the computer controller is configured to receive one or more instructions from a computing device associated with a user of the motorized makeup brush, wherein the one or more instructions comprise the particular pattern. In some embodiments, the computer controller is configured to enable the user to program the particular pattern.

As may be understood from FIG. 4, in particular embodiments, the particular pattern may comprise a particular brush routine such as, for example: (1) a sweeping motion; (2) a figure eight motion; (3) an angled rotation motion; (4) a combination rotation and sweeping motion; (5) a combination rotation and revolution-about-the-central-axis of the motorized brush handle motion; and (6) a combination rotation, sweeping, and revolution-about-the-central-axis of the motorized brush handle motion. In various embodiments, the computer controller is further configured to enable a user to record and share a particular brush routine with one or more other users for use on a second motorized makeup brush.

Brush with Mechanism for Selectively Adjusting Bristle Density

In particular embodiments, such as the embodiment shown in FIG. 5A-5B, the makeup brush 600 may include a collar 605 that may be used to selectively adjust the bristle density of the makeup brush's brush portion. As may be understood from this figure, in various embodiments, the collar 605 is substantially ring shaped and is connected to the handle portion of the brush via one or more linear actuators that are adapted to move the collar 605 linearly relative to the brush handle's central axis so that the center of the collar 605 remains substantially on the central axis of the handle portion as the collar 605 moves relative to the brush handle. As the linear actuators move the collar 605 from a first position, see FIG. 7A (in which the collar 605 is immediately adjacent the brush support end of the handle), to a second position, see FIG. 7B (in which the collar 605 is spaced apart from the handle's brush support end), the inside of the collar 605 engages the side perimeter portion of the bristles and moves the outer bristles closer to the central axis of the brush. This, in turn, moves the distal tips of the bristles closer together, causing the brush to have a higher bristle density at its distal end.

In various embodiments, the brush, or remote computing device, may include a suitable control mechanism for allowing a user to cause the actuators to selectively move the collar 605 toward or away from the handle of the brush (e.g., between the first and second positions, or other positions, in either direction). This may allow the user to dynamically control the rigidity of the brush, which may allow the user to use the same brush for different applications, or to create different effects.

Automated Makeup Brush Cleaning Assembly

In particular embodiments, a rotating makeup brush 300 may be adapted for use with a makeup brush cleaning apparatus that may include, for example, a makeup brush support and a cleaning surface. In particular embodiments, the makeup brush support is adapted to maintain the makeup brush in a substantially fixed position while: (1) the distal ends of the makeup brushes' bristles maintain contact with the cleaning surface (which may, for example, be a surface of a substantially circular rubber puck, or other suitable cleaning surface); and (2) the makeup brush's motor rotates the brush head (and its bristles) relative to the cleaning surface. This may, for example, cause the cleaning surface to clean the brush head's bristles by removing makeup from the bristles through frictional contact with the bristles.

Makeup Brush with Excess Makeup Detection System

A makeup brush (e.g., a computerized makeup brush) 300, according to various embodiments, may include one or more sensors 318 for automatically determining whether too much or too little makeup is currently on the makeup brush. For example, the makeup brush may comprise one or more weight sensors for sensing the weight of makeup on the makeup brush's bristles. In other embodiments, the makeup brush may comprise one or more sensors 318 that are adapted for sensing the deflection of one or more bristles as the makeup brush's brush head rotates, as described above. The makeup brush's onboard computer 308 (or a remote computer) may then use this deflection information (e.g., using any suitable algorithm) to determine the amount of makeup that is on the makeup brush's bristles.

In particular embodiments, the makeup brush and/or remote computer may be adapted to generate an alert in response to sensing: (1) that too much makeup is on the makeup brush's bristles; and/or (2) that too little makeup is on the makeup brush's bristles (e.g., while the makeup brush is in use). This may help the user obtain a better overall application of the makeup by maintaining the correct amount of makeup on the brush during use.

Makeup Brush with Selectively Configurable Bristle Configuration

Turning now to FIGS. 6A-6C, in various embodiments, the makeup brush may be configured to work with various replaceable brush heads that are adapted to be selectively coupled to the makeup brush. In various embodiments, such as the embodiment shown in FIGS. 6A-6C, the brush head 500 may comprise a first body 505 (e.g., a generally cylindrical body having a first recess) that is configured on one end to releasably couple to the motor contained in the makeup brush either directly or through one or more other mechanical connections such that rotation of the motor causes the first body 505 to rotate with respect to the makeup brush's handle. In various embodiments, the first body 505 may be substantially cylindrical and comprise a first plurality of first, outwardly extending bristles. The first body 505 may be surrounded by a second body 510 (e.g., a generally ring shaped body) that is axially moveable with respect to the first body in a direction parallel to the axis of rotation of the first body 505. In some embodiments, the second body 510 may be formed in the shape of a ring with an inner opening that is slightly larger than the diameter of the first body 505. In various embodiments, the second body 510 may contain a second plurality of outwardly extending second bristles. In particular embodiments, the second body 510 may be movable between one of at least three positions, which are shown, respectively, in FIGS. 6A-6C. In a first position, shown in FIG. 6A, the free ends of the first plurality of first bristles of the first body 505 are substantially coplanar with the free ends of the second plurality of second bristles of the second body 510. In a second position, shown in FIG. 6C, the ends of the first plurality of first bristles of the first body 505 are recessed from the free ends of the second plurality of second bristles of the second body 510. In the third position, shown in FIG. 6B, the free ends of the second plurality of second bristles of the second body 510 are recessed from the free ends of the first plurality of first bristles of the first body 505. In this way, the width of the bristles that engage with the user's skin may be changed. Moreover, the configuration shown in FIG. 6C also alleviates undue pressure exerted by the center bristles. In order to secure the second body 510 in one of the first, second or third positions with respect to the first body 505, a spring loaded ball, pin or other locking mechanism may be formed in one of the first and second bodies 505, 510 and a detent (a recess, a blind bore, etc.) may be formed in the other one of the first and second bodies 505, 510 so as to axially and rotationally retain the first body 505 to the second body 510.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. Although the invention is discussed above in reference to makeup brushes, various embodiments of the invention may be implemented in a variety of other different contexts. For example, various embodiments may be implemented in the context of brushes that are adapted for applying creams, lotions or oils to the human body. In addition, although specific terms are employed herein, they are used in a generic and descriptive sense only and not for the purposes of limitation.

What is claimed:

1. A makeup brush movement tracking system comprising:
   a. a housing defining an interior portion, the housing being structured to be attached to a makeup brush and to be kept attached to the makeup brush as the makeup brush is used by a user;
   b. a motion sensing and computing system disposed within the housing's interior portion, the motion sensing and computing system comprising:
      i. one or more computer processors;
      ii. memory operatively coupled to the one or more processors; and
      iii. at least one sensor that is operatively coupled to the one or more processors, wherein:
         i. the at least one sensor is adapted to sense movement of the makeup brush relative to a particular portion of the user's body as the makeup brush is used to apply makeup to the particular portion of the user's body and while the housing is attached to the makeup brush; and
         ii. the one or more processors are adapted record data representing the movement of the makeup brush relative to the particular portion of the user's body over a particular period of time as the makeup brush is used to apply makeup to the particular portion of the user's body, and to coordinate saving the recorded movement of the makeup brush to memory, wherein:
            the makeup brush comprises:
            a handle having a first end and a second end; and
            a brush head having a plurality of bristles, wherein an end of the brush head is attached adjacent the first end of the handle.

2. The makeup brush movement tracking system of claim 1, wherein the one or more processors are adapted to facilitate the transmission of the data representing the movement of the makeup brush to an external computing system so that the external computing system generates and displays, to a user, a visual representation of the movement of the makeup brush over the particular period of time.

3. The makeup brush movement tracking system of claim 2, wherein the external computing system comprises a handheld computing device that is adapted for running executable software to generate and display the visual representation of the movement of the makeup brush over the particular period of time.

4. The makeup brush movement tracking system of claim 2, wherein the visual representation of the movement of the makeup brush depicts the movement of the makeup brush relative to the particular portion of the user's body over the particular period of time.

5. The makeup brush movement tracking system of claim 4, wherein the visual representation comprises a visual representation of the particular portion of the user's body and a moving visual representation of the makeup brush as the makeup brush applies makeup to the particular portion of the user's body over the particular period of time.

6. The makeup brush movement tracking system of claim 4, wherein the visual representation of the makeup brush comprises an animated representation of the makeup brush that has been generated based, at least in part, on the recorded data.

7. The makeup brush movement tracking system of claim 6, wherein the visual representation of the particular portion of the user's body comprises a computer-generated representation of the particular portion of the user's body.

8. The makeup brush movement tracking system of claim 6, wherein the visual representation of the particular portion of the user's body comprises an image of the particular portion of the user's body.

9. The makeup brush movement tracking system of claim 8, wherein:
   a. the makeup brush movement tracking system comprises a camera that is operably connected to the one or more processors;
   b. the image of the particular portion of the user's body is an image that was captured by the camera during the particular period of time.

10. The makeup brush movement tracking system of claim 4, wherein:
    a. the makeup brush movement tracking system comprises a camera that is operably connected to the one or more processors; and
    b. the visual representation of the particular portion of the user's body comprises a video of the particular portion of the user's body taken by the camera over the particular period of time.

11. The makeup brush movement tracking system of claim 10, wherein the visual representation of the movement of the makeup brush is a graphical animation of the movement of the makeup brush that is used, in conjunction with the video, to display an enhanced reality depiction of the movement of the makeup brush relative to the particular portion of the user's body over the particular period of time.

12. The makeup brush movement tracking system of claim 1, wherein the at least one sensor further comprises at least one sensor selected from a group consisting of:
    a. a gyroscope;
    b. an accelerometer;
    c. a magnetometer; and
    d. a camera.

13. The makeup brush movement tracking system of claim 1, wherein the housing comprises at least one structural portion selected from a group consisting of:

a. a portion defining an opening that is sized to receive a portion of the makeup brush's handle through the opening so that the housing is held in place adjacent the makeup brush's handle by the frictional engagement of an exterior portion of the makeup brush's handle and the portion of the housing that defines the opening; and b. a fastener that is adapted to fasten the housing to a portion of the makeup brush and to maintain the housing adjacent the portion of the makeup brush as the user uses the makeup brush to apply makeup to a portion of the user's body.

14. A computer-implemented method of training a user to effectively apply makeup using a makeup brush, the method comprising:

a. receiving, from a makeup brush movement tracking system that comprises at least one sensor for sensing the movement of the makeup brush relative to a particular portion of a user's body, data representing a movement of the makeup brush relative to the particular portion of the user's body over a particular period of time as the makeup brush is used to apply makeup brush to the particular portion of the user's body; and b. using the data to generate and display, to a user, a visual representation of the movement of the makeup brush over the particular period of time, wherein:

the at least one sensor for sensing the movement of the makeup brush relative to the particular portion of the user's body is physically attached to an interior or exterior portion of the makeup brush.

15. The computer-implemented method of claim 14, wherein the visual representation of the movement of the makeup brush depicts the movement of the makeup brush relative to the particular portion of the user's body over the particular period of time.

16. The computer-implemented method of claim 15, wherein the visual representation comprises a visual representation of the particular portion of the user's body and a moving visual representation of the makeup brush as the makeup brush applies makeup to the particular portion of the user's body over the particular period of time.

17. The computer-implemented method of claim 15, wherein the visual representation of the makeup brush comprises an animated representation of the makeup brush that has been generated based, at least in part, on the recorded data.

18. The computer-implemented method of claim 14, wherein the visual representation of the movement of the makeup brush is a graphical animation of the movement of the makeup brush that is used, in conjunction with the video, to display an enhanced-reality depiction of the movement of the makeup brush relative to the particular portion of the user's body over the particular period of time.

19. A non-transitory computer-readable medium storing computer-executable instructions for training a user to effectively apply makeup using a makeup brush, the computer-executable instructions comprising instructions for:

a. receiving, from a makeup brush movement tracking system that comprises at least one sensor for sensing the movement of the makeup brush relative to a particular portion of a user's body, data representing a movement of the makeup brush relative to the particular portion of the user's body over a particular period of time as the makeup brush is used to apply makeup to the particular portion of the user's body; and b. using the data to generate and display, to a user, a visual representation of the movement of the makeup brush over the particular period of time, wherein:

the at least one sensor for sensing the movement of the makeup brush relative to the particular portion of the user's body is physically attached to an interior or exterior portion of the makeup brush.

20. The non-transitory computer-readable medium of claim 19, wherein the visual representation of the movement of the makeup brush depicts the movement of the makeup brush relative to the particular portion of the user's body over the particular period of time.

\* \* \* \* \*